(12) United States Patent  (10) Patent No.: US 7,620,311 B2
Ito et al.  (45) Date of Patent: Nov. 17, 2009

(54) AUTO-FOCUS APPARATUS, IMAGE-CAPTURE APPARATUS, AND AUTO-FOCUS METHOD

(75) Inventors: Yujiro Ito, Kanagawa (JP); Hidekazu Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 11/823,732

(22) Filed: Jun. 28, 2007

(65) Prior Publication Data

US 2008/0002960 A1 Jan. 3, 2008

(30) Foreign Application Priority Data

Jun. 30, 2006 (JP) ............................ P2006-182567

(51) Int. Cl.
  *G03B 3/00* (2006.01)
  *G03B 13/00* (2006.01)
  *H04N 5/232* (2006.01)
(52) U.S. Cl. .................. 396/125; 348/345; 348/E5.042; 348/E5.045
(58) Field of Classification Search .................. 396/72, 396/79, 90, 125, 135; 348/345
  See application file for complete search history.

(56) References Cited

U.S. PATENT DOCUMENTS

2005/0099523 A1* 5/2005 Konishi et al. .............. 348/345

2008/0012977 A1* 1/2008 Ito et al. ...................... 348/345

FOREIGN PATENT DOCUMENTS

JP 2005-92085 4/2005
JP 2006-301032 11/2006

* cited by examiner

*Primary Examiner*—Melissa J Koval
(74) *Attorney, Agent, or Firm*—Frommer Lawrence & Haug LLP; William S. Frommer; Thomas F. Presson

(57) ABSTRACT

An auto-focus apparatus including an evaluation value calculator periodically calculating evaluation values using high frequency components of image signals in a specific region of a subject image, a distance measurement unit measuring a distance to a subject and output a distance measurement result, a control unit outputting instruction values based on the evaluation values and determining whether a subject image is in-focus or out-of-focus, and a storage storing the distance measurement results and lens positions. In the apparatus, after searching the peak of the evaluation values, the control unit returns the lens to the position at which the relative maximum has been detected, obtains evaluation values, stores lens positions and distance measurement results when the evaluation values satisfy a prescribed condition, and retrieves distance measurement results and lens positions when the number of times that results are stored reaches a prescribed number, and computes a correction amount.

13 Claims, 16 Drawing Sheets

AUTO-FOCUS APPARATUS, IMAGE-CAPTURE APPARATUS, AND AUTO-FOCUS METHOD

CROSS-REFERENCES TO RELATED APPLICATIONS

The present invention contains subject matter related to Japanese Patent Application JP 2006-182567, filed in the Japanese Patent Office on Jun. 30, 2006, the entire contents of which are incorporated herein by reference.

BACKGROUND OF THE INVENTION

1. Field of the Invention

This invention relates to an auto-focus apparatus, image-capture apparatus, and auto-focus method, in which the distance measurement result of a distance measurement sensor and an evaluation value obtained from image processing are combined for use in automatically adjusting focus on a subject, so that the subject image is in focal status (herein after called the "in-focus").

2. Description of the Related Art

Image capture devices such as video cameras and digital still cameras include automatic focus adjustment (auto-focus or "AF") functions to automatically adjust the focal position to a subject. Various technologies have been proposed to improve the accuracy of such auto-focus functions.

For example, Japanese Unexamined Patent Application No. 2005-92085 discloses a focus detection and adjustment device that has phase difference detection-type focus adjustment unit and contrast detection-type focus adjustment unit, and which detects the difference in focus positions for the two focus adjustment unit and updates a conversion coefficient used in the phase difference detection-type focus adjustment unit. Through this configuration, the focus adjustment accuracy can be improved easily without any effort by a user capturing the image.

Further, the configuration of another video camera used is described. FIG. 1 shows the overall configuration of another video camera. This video camera combines a distance measurement sensor and an image processing AF function, and performs auto-focus operations. The lens block of the video camera shown in FIG. 1 includes a lens group having an image-capture lens 101c and a focus lens 101, as well as a position detector 101a, a lens drive mechanism 101b, and a lens driver 102. Also, the camera block includes an image-capture device 103, image-capture device driver 104, image signal generator 105, image signal processor 106, evaluation value calculator 107, control unit 109, memory 110, and distance measurement sensor 111.

In the video camera shown in FIG. 1, a subject image, with focus adjusted through the focus lens 101, is formed on a CCD (Charge Coupled Device) or other image-capture device 103, and after photoelectric conversion by the image-capture device 103, electrical signals are output to the image signal generator 105. The focus lens 101 is moved by the lens drive mechanism 101b, which receives instructions from the lens driver 102. The lens driver 102 includes a lens CPU and lens driving circuit, and outputs instructions to cause movement of the focus lens 101 to the focus position according to instructions from the control unit 109. The position of the focus lens 101a, that is, the focus position, is detected by the position detector 101a.

The image-capture device driver 104 drives the image-capture device 103 that generates signals for photoelectric conversion of the image of the subject formed. In the image signal generator 105, electrical signals output from the image-capture device 103 are subjected to appropriate signal processing to generate image signals conforming to a prescribed standard. The image signals are transmitted to a circuit group (image signal processor 106) and are also input to the evaluation value calculator 107. The evaluation value calculator 107 filters high-frequency components of image signals in a specific region provided within a captured image frame, and computes an evaluation value corresponding to the contrast in the image. For subjects in general, the evaluation value increases as the focus lens approximates the point at which a subject image is in-focus state, and the evaluation value is relative maximum when the subject image is in-focus. This evaluation value is updated once for one field of image signals. In relation to auto-focus operations using evaluation values (evaluation value peak determination), one example is disclosed in Japanese Unexamined Patent No. 10-213736, filed by the present applicant.

The control unit 109 includes a CPU (Central Processing Unit) and the like, and receives evaluation values computed once for each field by the evaluation value calculator 107, and also receives distance measurement results from the distance measurement sensor 111 for an unspecified period, and uses these results (data) to perform an evaluation value peak search operation. The memory 110 is semiconductor memory or other nonvolatile memory, and stores the distance measurement results of the distance measurement sensor 111, focus positions of the lens 101, and other information.

The distance measurement sensor 111 includes an optical detection function and an output circuit, and measures the distance to a subject upon an instruction from the control unit 109 and outputs the result to the control unit 109. The range of existence of the subject is identified from the distance measurement results, that is, the approximate distance to the subject can be identified within a certain range.

By using the distance measurement information of the distance measurement sensor 111 and the evaluation value of the evaluation value calculator 107, while securing focus searching accuracy obtained through image processing, the focusing time when the focus lens is far from the focus position can be greatly decreased compared with image processing auto-focus operations. However, the distance measurement results of the distance measurement sensor 111 must always fall within a constant range of accuracy.

FIG. 2 shows the relation 1 between the distance to a subject before the changes occur in the distance measurement sensor 111 due to aging, and the distance measurement result of the distance measurement sensor 111. The accuracy of the distance measurement result has a constant width, and as shown in FIG. 2, the correspondence relation is described not by a line, but by a region 120 having a certain area. For example, when the distance measurement result is Ls, the distance to the subject cannot be identified uniquely, but as shown in FIG. 2, a subject existence range FJA within which the existence of the subject can be identified.

FIG. 3 shows an auto-focus operation 1 using distance measurement results. In FIG. 3, the evaluation value peak corresponds to the in-focus position FPj. First, when the focus position FPs at the start is more distant than a determination position LD1 from the subject existence range FJA based on the distance measurement result obtained by the distance measurement sensor 111, the motion velocity of the focus lens 101 is set to an ultra-high velocity Va which is the maximum velocity of lens driving. The motion direction is the direction toward the subject existence range FJA, and focusing operation is initiated. When the focus position FPs reaches the determination distance LD2 from the subject existence range FJA, the control unit 109 switches from the ultra-high velocity Va to a high velocity Vb. When the focus position FPs enters the subject existence range FJA, the focus position FPs is moved at a low velocity Vc such that an evaluation value, obtained by adding the frequency components of image signals in a specific region provided in a captured image frame, becomes relative maximum. In this way, by obtaining the subject existence range based on distance measurement results from the distance measurement sensor 111, the focus lens can be advanced at ultra-high speed Va from the near edge of the subject existence range FJA shown in FIG. 2 until a prescribed distance LD2 is reached, and as a result the focusing time can be shortened. Further, there is no need to perform wobbling and determine the motion direction due to changes in the evaluation value, so that a subject image free from blurring can be obtained rapidly with short focusing time.

SUMMARY OF THE INVENTION

However, when the distance measurement results of the distance measurement sensor change with aging and exceed the allowable range, there arises some trouble while auto-focus operations. Below, such a case is described, referring to FIG. 4, in which aging changes occur in a distance measurement sensor, so that the relation between the distance to the subject and the distance measurement result changes.

In FIG. 4, the correspondence relation between the distance to the subject before changes with aging and the distance measurement result is indicated by the region 120, and that after changes with aging is indicated by the region 121. In this example, the subject existence range FJAB corresponding to the distance measurement result LsB before changes with aging, and the subject existence range FJAA corresponding to the distance measurement result LsA after changes with aging, are identified; the distance measurement results after changes with aging are larger than the distance measurement results before changes with aging, and accuracy has deteriorated.

Upon using the distance measurement result after aging changes LsA to compute the subject existence range, because the occurrence of aging changes has not been recognized (or corrected), an erroneous subject existence range FJAA is output, as shown in FIG. 4. This erroneous subject existence range FJAA is substantially shifted to larger values from the actual subject distance, that is, from the in-focus position FPj, as is seen from FIG. 4. When this erroneous subject existence range FJAA is used to switch between the above-described ultra-high velocity Va and high velocity Vb, the subject evaluation value peak (in-focus position FPj) corresponding to the in-focus position FPj is approached too closely, as shown in FIG. 5, the switching point occurs immediately before the evaluation value peak, and consequently the brake is applied too slowly, and the evaluation value peak is substantially overshot. Thus there is the problem that the switching timing is not appropriate, and as a result the auto-focus operation is not natural.

In addition, aging changes in distance measurement results generally entail either increases in or decreases in the distance measurement result. This is because the distance measurement sensor (for example, a phase different detection type sensor) measures distances using the principle of triangulation, and the main cause of shifts in the result is changes in the distance relation between the lens and the line sensor. Due to aging changes, the above-described distance relation becomes either longer or shorter, and this determines whether the distance measurement result is larger than or smaller than the actual value.

The present invention was devised in light of the above, and has as a subjective, when performing auto-focus operations using the distance measurement results of a distance measurement sensor, prevention of the occurrence of problems in auto-focus operations even when aging changes or the like occur in the distance measurement sensor.

In order to resolve the above problems, one embodiment of the invention is characterized in that, in auto-focus operation combining a distance measurement sensor and an auto-focus function employing image processing, the high-frequency components of image signals in a specific region captured by an image-capture unit are used to periodically compute an evaluation value, and the distance to the subject is measured and a distance measurement result is output. Subsequently, an evaluation peak search operation is performed while moving the lens focus position, according to the above evaluation value and the above distance measurement result. When the relative maximum of the evaluation value is detected, the lens is returned to the focus position corresponding to the point at which the relative maximum value has been detected, and the evaluation value is calculated. Then, the distance measurement result and focus position when these evaluation values satisfy prescribed conditions are stored in a storage, and when the number of times stored reaches a prescribed number, the distance measurement results and focus positions stored in the storage are read, and based on the read-out distance measurement results and focus positions, a distance measurement result correction amount is computed.

By means of the above configuration, the focus positions and distance measurement results finally obtained in pre-scribed in-focus determinations using image processing are stored, and when the number stored reaches a prescribed number, a correction amount for distance measurement results is calculated based on the relation between focus positions and measured distances, so that even when changes with aging of the distance measurement unit or other changes occur within the distance measurement unit, the distance measurement results of the distance measurement unit can be appropriately corrected, and accuracy can be retained.

In addition, another embodiment of the invention is characterized in that, in auto-focus operation combining a distance measurement sensor and an auto-focus function employing image processing, the high-frequency components of image signals in a specific region captured by an image-capture unit are used to periodically compute an evaluation value, and the distance to the subject is measured and a distance measurement result is output. Subsequently, an evaluation peak search operation is performed while moving the lens focus position, according to the above evaluation value and the above distance measurement result. When the relative maximum of the evaluation value is detected, the lens is returned to the focus position corresponding to the point at which the relative maximum value has been detected, and the evaluation value is calculated. Here, when a permission signal from an operation unit is detected, the distance measurement results and focus positions when these evaluation values satisfy prescribed positions are stored in a storage, and when the number of times stored reaches a prescribed number, the distance measurement results and focus positions stored in the storage are read, and based on the read-out distance measurement results and focus positions, a distance measurement result correction amount is computed.

By means of the above configuration, the focus positions and distance measurement results finally obtained in prescribed in-focus determinations using image processing are stored, and when the number stored reaches a prescribed number, a correction amount for distance measurement results is calculated based on the relation between these focus positions and measured distances, so that even when changes with aging of the distance measurement unit or other changes occur within the distance measurement unit, the distance measurement results of the distance measurement unit can be appropriately corrected, and accuracy can be retained. At this time, the above storage processing is performed after obtaining permission from the user, so that correction amounts not intended by the user, resulting from erroneous in-focus determinations, are not computed.

By means of this invention, correction amounts for distance measurement results are computed based on focus positions and distance measurement results finally obtained in prescribed in-focus determinations using image processing during auto-focus operations, so that even if aging changes or the like occur in the distance measurement unit, the accuracy of distance measurement results of the distance measurement unit can be retained.

Further, the distance measurement results of the distance measurement unit always maintain a constant accuracy, so that in auto-focus operations combining distance measurement results of the distance measurement unit and evaluation values of image processing, focus searching can be performed appropriately, and the focusing time when the focus is distant from the focused position can be shortened while securing the searching accuracy obtained from image processing.

DESCRIPTION OF THE PREFERRED EMBODIMENTS

Embodiments of the invention are described in detail, referring to the attached drawings.

Figure 1:
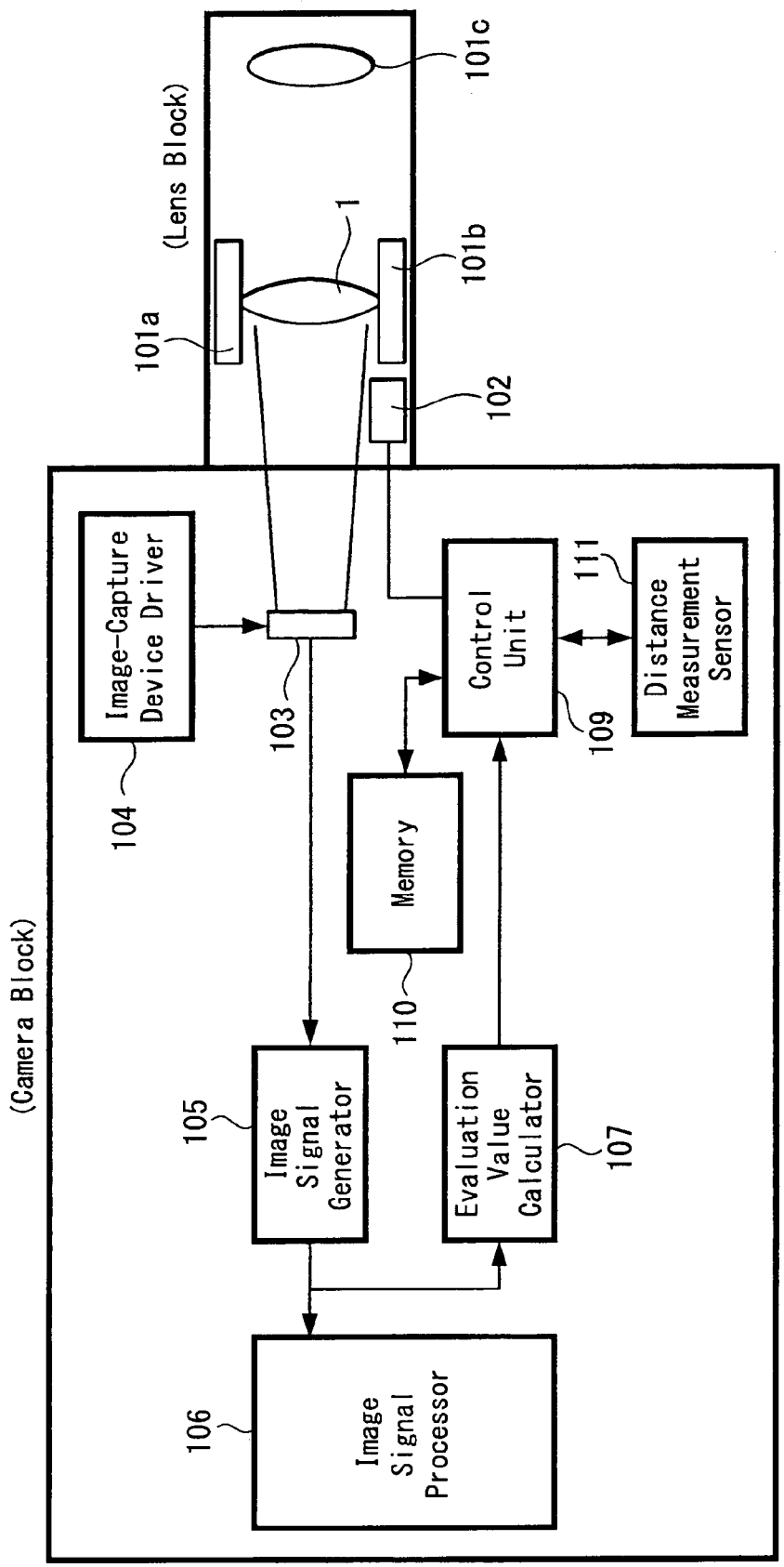
FIG. 1 shows the configuration of a video camera according to the related art.
Figure 2:
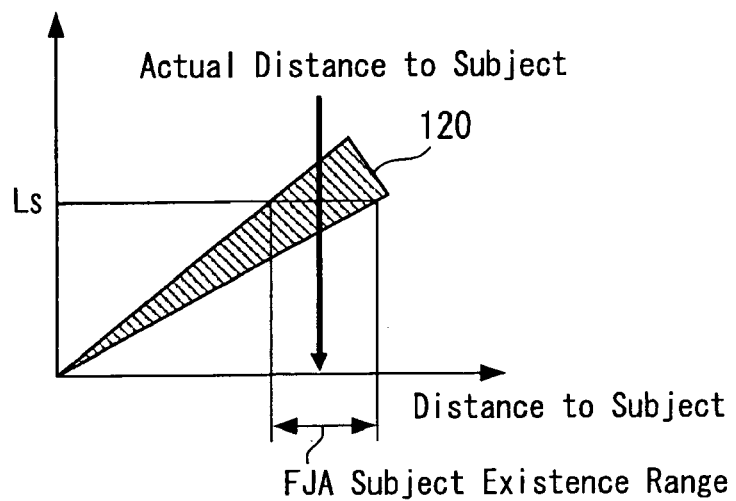
FIG. 2 shows a (first) relation between subject distance and distance measurement results according to an embodiment of the present invention.
Figure 6:
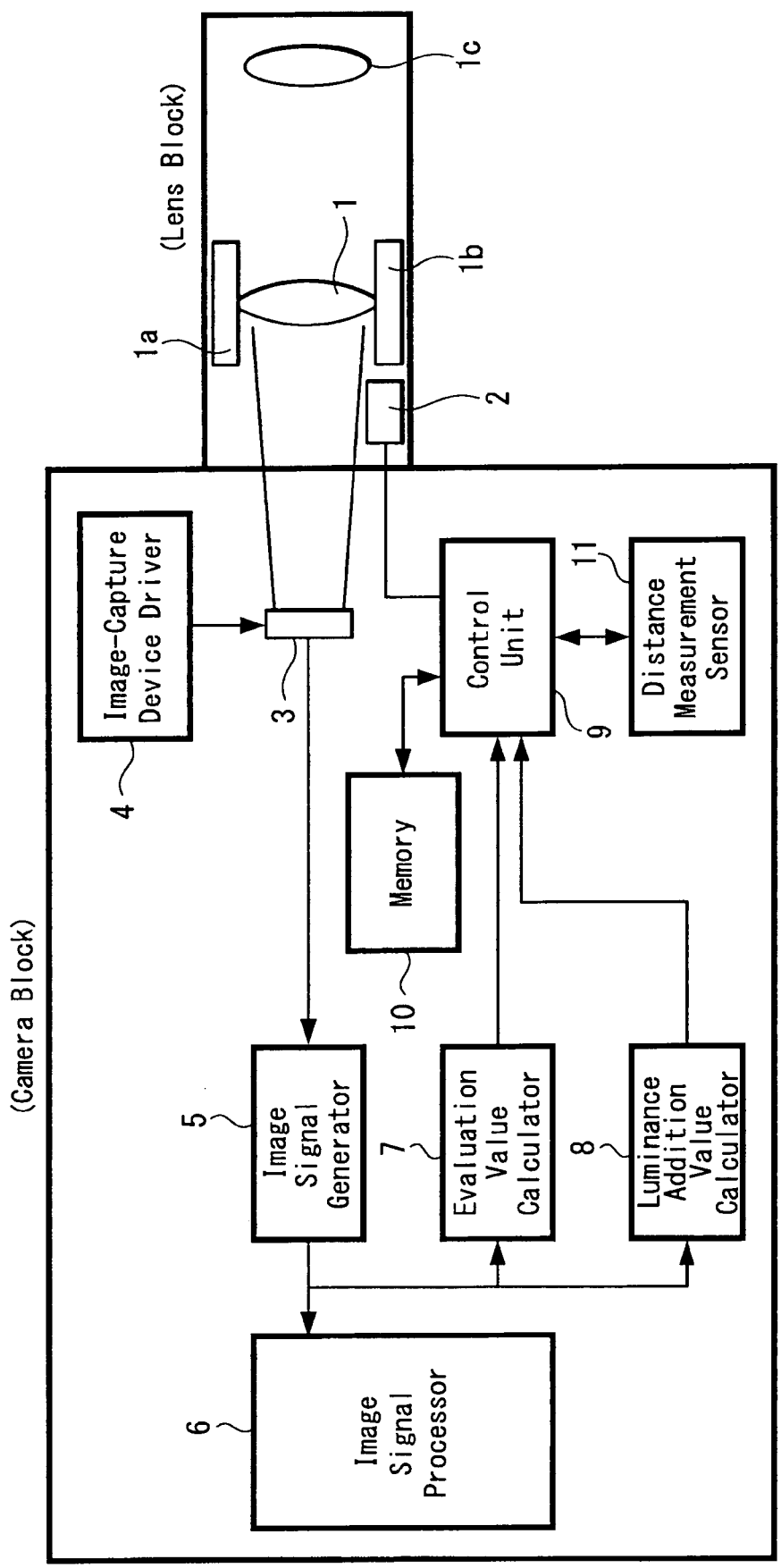
FIG. 6 shows the configuration of the video camera according to a first embodiment of the present invention.
Figure 7:
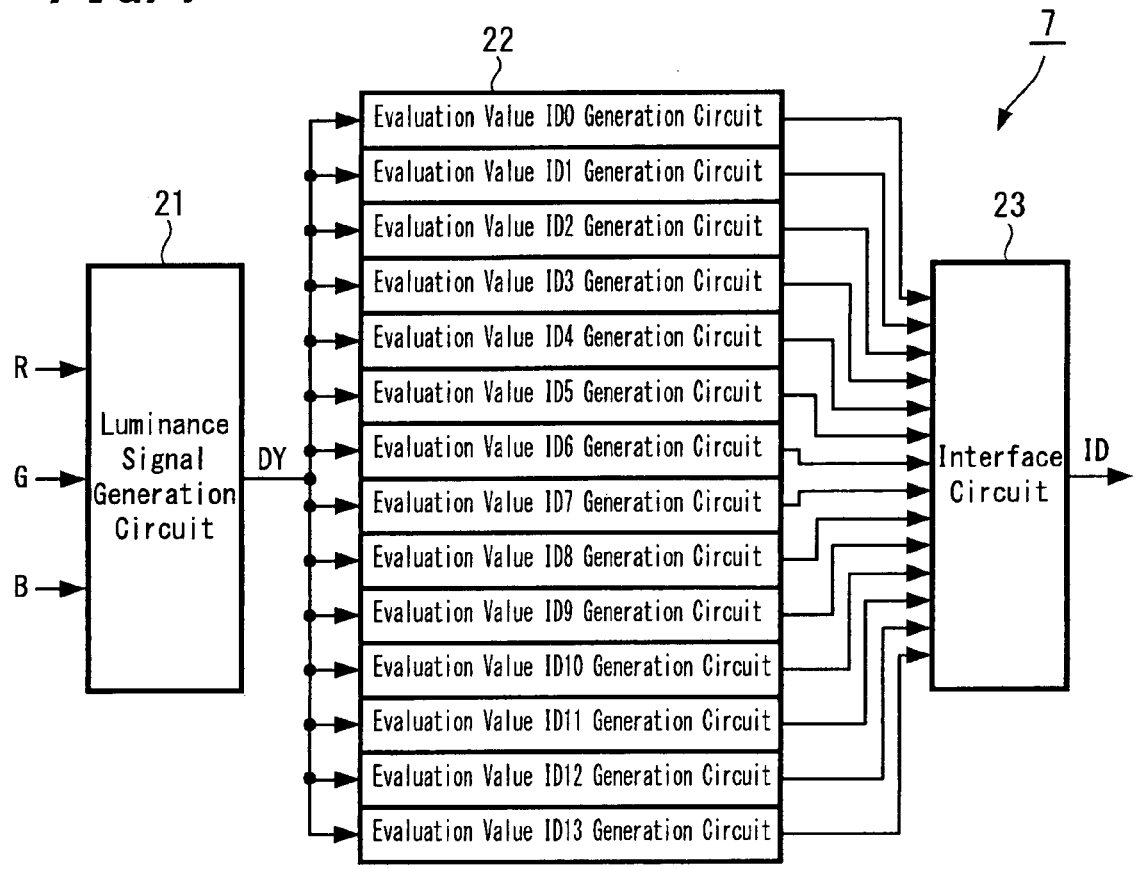
FIG. 7 shows the configuration of an evaluation value calculator according to an embodiment of the present invention.
Figure 8:
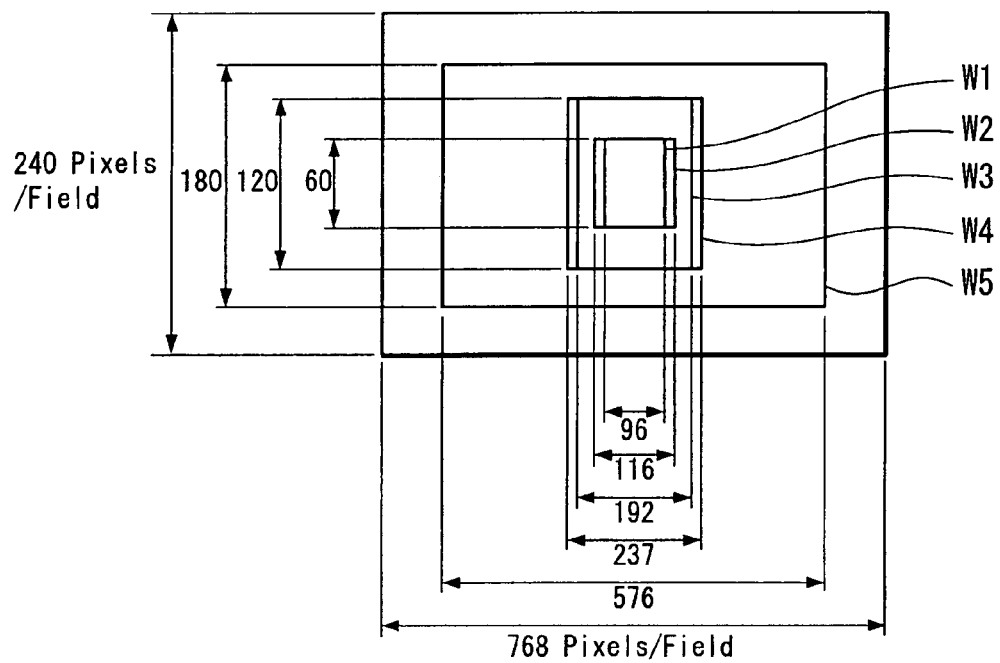
FIG. 8 shows an evaluation frame size according to an embodiment of the present invention.
Figure 9:
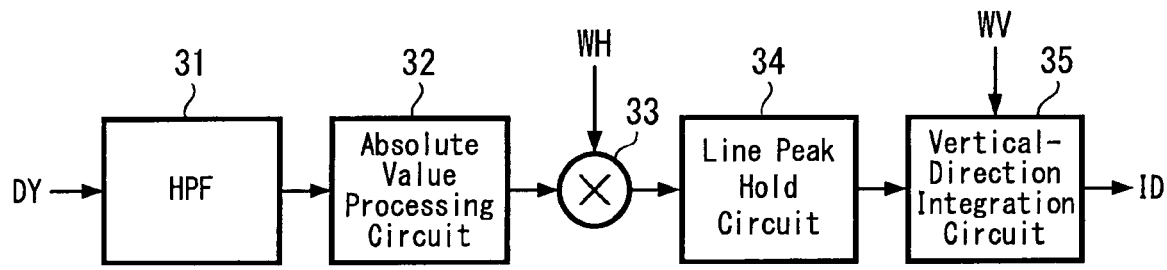
FIG. 9 shows the configuration of a horizontal-direction evaluation value computation filter according to an embodiment of the present invention.

FIG. 6 illustrates a configuration of an image-capture apparatus, such as a video camera, including an auto-focus mechanism according to a first embodiment of the present invention. The video camera shown in FIG. 6 includes a luminance addition value calculator configured to generate luminance addition values obtained by integrating luminance in a specific region (central portion) of imaged signals, Interface (IF) unit, and a monitor, in addition to the configuration shown in the FIG. 1.

A lens block of the video camera includes a lens group that has a focus lens 1 configured to focus a subject image incident on an image-capture lens 1c on an image-capture surface of the image-capture device, a position detector configured to detect positions of each lens, a lens drive mechanism configured to drive each lens, and a lens driver configured to control movement of the lens drive mechanism. Lenses such as a wobbling lens used to determine the directions of focal position other than the focus lens 1 and the image-capture lens 1c are omitted from the lens block shown in FIG. 6.

The focus lens 1 includes the position detector 1a configured to detect positions of the focus lens 1 or focus positions, the lens drive mechanism 1b configured to move the positions of the focus lens in the direction of an optical axis, and the lens driver 2 configured to move the lens drive mechanism. Likewise, a wobbling lens (not shown) includes a wobbling lens driving mechanism configured to move a position detector and lens position in the direction of an optical axis in order to perform appropriate wobbling. The lens block includes an aperture stop (not shown) configured to limit an amount of light that can pass through; and the aperture stop includes an aperture stop position detector configured to detect the aperture size of the aperture stop and an aperture stop drive mechanism configured to open and close the aperture stop.

The lens driver 2 is supplied with respective detected signals from the position detector 1a including: a signal to indicate focus positions, a signal to indicate an amount of wobbling, and a signal to indicate the aperture size of the aperture stop. The lens driver 2 including a lens CPU and a lens drive circuit is configured to move a focus (focal point) of the focus lens 1 according to instructions transmitted from the control unit 9. The lens driver 2 is connected with a user interface (not shown) configured to set modes of auto-focus or initiate the auto-focus operation, so that the lens driver 2 is supplied with operation signals according to operation of the user interface. The lens driver 2 includes a storage (not shown) having a ROM or EEPROM, on which information is stored, such as focal length data of the focus lens 1 and the wobbling lens, aperture ratio data, the name of manufacturer, and manufacturer's serial numbers.

The lens driver 2 generates lens drive signals based on the stored information, respective detected signals, and focus control signals or wobbling control signals described later supplied from the control unit 9. The lens driver 2 also supplies generated lens drive signals to the lens drive mechanism 1b to move the focus lens 1 to a desired focus position. The lens driver 2 supplies the generated lens drive signals to a wobbling lens drive mechanism to wobble the wobbling lens, so that the focus lens 1 may detect a direction of a focus position. The lens driver 2 further generates aperture stop drive signals to control the aperture size of the aperture stop.

In the video camera shown in FIG. 6, the subject image is formed on the image-capture device 3 via the focus lens 1, is then photo-electrically converted into electric signals by the image-capture device 3 and output to the image signal generator 5. The image-capture device 3 may include a CCD (Charge Coupled Devices), CMOS (Complementary Metal Oxide Semiconductor), and the like. The image-capture device driver 4 is one example of the image-capture device drive circuit that supplies drive signals to the image-capture device 3 for photo-electronically converting the subject image formed on the image-capture device 3 into signals. The drive signals are supplied based on a vertical direction synchronization signal, a horizontal direction synchronization signal, and a clock signal generated from a clock signal generator that all used for a standard operation for each unit of the video camera.

In image signal generator 5, electric signals output from the image-capture device 3 are subject to appropriate signal processing, and image signals complied with a prescribed standard are generated. The image signals are transmitted to a circuit group (image signal processor 6), and are also input to the evaluation value calculator 7. The evaluation value calculator 7 is configured to filter high frequency components of image signals in a specific region provided within a captured image frame, and calculates the evaluation values relative to the image contrast. In imaging a typical subject, the evaluation values generally increases as a subject image approximates in-focus state, and the evaluation value is relative maximum when the subject image is in-focus. The evaluation value is updated once for one field of image signals. Auto-focus operation using evaluation values is well-known technology in the art, one example of which is described in detail in Japanese Unexamined Patent Application Publication No. 10-213736 previously disclosed by the applicant of the present invention.

The aforementioned processing is performed for each of three primary colors R (Red), G (Green), and B (Blue). For example, the camera block includes a color separating prism (not shown). The color separating prism separates light incident from the lens block into the three primary colors R, G, and B, and supplies the R component light to R component image-capture device, the G component light to G component light to G component image-capture device, and the B component light to B component image-capture device, respectively. In FIG. 6, the three R, G, and B component image-capture devices are represented as an image-capture device 3.

The subject images for each color formed on the image-capture device 3 are subject to prescribed processing before the subject images are photo-electrically converted into signals by the image-capture device 3 and output to the image signal generator 5. The image signal generator 5, for example, includes a preamplifier (not shown) and an A/D (Analog/Digital) converter. The level of the electric signals input to the image signal generator 5 is amplified by the preamplifier, and correlated double sampling is performed on the signals to eliminate a reset noise, and the A/D converter converts analog signals into digital image signals.

Further, the image signal generator 5 is configured to perform gain control, black level stabilizer, or dynamic range control, and the like of the supplied image signals for each color, and supply the image signals thus obtained to the image signal processor 6, the evaluation value calculator 7, and the luminance addition value calculator 8.

The image signal processor 6 performs various signal processing of the image signals supplied from the image signal generator 5, and generates output image signals. For example, the image signal processor 6 performs knee correction to compress image signals at or above a certain level, gamma correction to set a correct level for image signals according to a configured gamma curve, and white clip processing or black clip processing to limit image signal levels to a prescribed range. The image signal processor 6 also performs edge enhancement processing or linear matrix processing, encode processing, or the like to generate output image signals in a desired format.

The evaluation value calculator 7 filters the high frequency components using image signals in a specific region provided within the captured image frame of the image signals to calculate evaluation values ID corresponding to the image contrast and supply the calculated evaluation values ID to the control unit 9.

The image signal generator 5 having such as a preamplifier and A/D converter, the image signal processor 6, the evaluation value calculator 7, and the like, perform respective processing using the vertical direction synchronization signal VD, the horizontal direction synchronization signal HD, and the clock signal CLK synchronized with the image signals supplied from units, the image signal processor 6, the evaluation value calculator 7. The vertical direction synchronization signal VD, the horizontal direction synchronization signal HD, and the clock signal CLK may alternatively be obtained from the clock signal generator.

Figure 3:
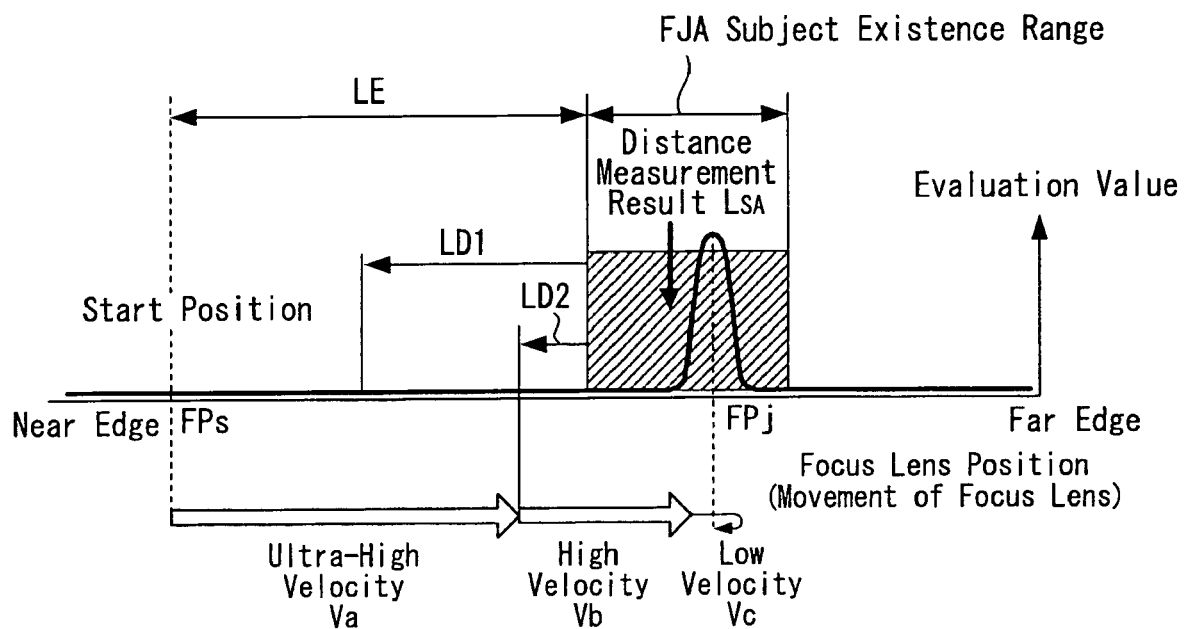
FIG. 3 is used to explain a (first) auto-focus operation using distance measurement results according to an embodiment of the present invention.

The evaluation value calculator 7 is described more in detail below. FIG. 3 illustrates a configuration of the evaluation value calculator 7. The evaluation value calculator 7 includes a luminance signal generation circuit 21 configured to generate a luminance signal DY based on image signals for each color, the evaluation value generation circuit 22 to generate 14 types of evaluation values ID0 to ID13 as described below, and an interface circuit 23. The interface circuit 23 is configured to communicate with the control unit 9 and supply the generated evaluation values according to requests from the control unit 9.

The image signal generator 21 performs the following operation: DY=0.30R+0.59G+0.11G using the image signals R, G, B supplied from the image signal generator 5 and generate a luminance signal DY. The luminance signal DY is generated in this manner, because it is sufficient to simply detect changes in the level of contrast and determine whether contrast is high or low in order to determine whether a subject image is in-focus or out of focus.

The evaluation value generator 22 generates the evaluation values ID0 to ID13. The evaluation values ID0 to ID13 are obtained by summing the frequency components of image signals in a specific region (hereinafter called "evaluation frame") provided within the captured image frame, and provide values corresponding to the blurring of the image.

Evaluation values ID0: Evaluation value name "IIR1_W1_HPeak"
Evaluation values ID1: Evaluation value name "IIR1_W2_HPeak"
Evaluation values ID2: Evaluation value name "IIR1_W2_HPeak"
Evaluation values ID3: Evaluation value name "IIR4_W3_HPeak"
Evaluation values ID4: Evaluation value name "IIR0_W1_VIntg"
Evaluation values ID5: Evaluation value name "IIR3_W1_VIntg"
Evaluation values ID6: Evaluation value name "IIR1_W1_HIntg"
Evaluation values ID7: Evaluation value name "Y_W1_HIntg"
Evaluation values ID8: Evaluation value name "Y_W1_Satul"
Evaluation values ID9: Evaluation value name "IIR1_W3_HPeak"
Evaluation values ID10: Evaluation value name "IIR1_W4_HPeak"
Evaluation values ID11: Evaluation value name "IIR1_W5_HPeak"
Evaluation values ID12: Evaluation value name "Y_W3_HIntg"
Evaluation values ID13: Evaluation value name "Y_W3_HIntg"

Evaluation value names indicating the attributes (data used_evaluation frame size_evaluation calculation method) are provided with the evaluation values ID0 to ID13.

The data used in the evaluation value names are broadly divided into "IIR" and "Y". "IIR" implies data including high-frequency components obtained from the luminance signal DY using a HPF (high-pass filter); whereas "Y" implies data using original frequency components of the luminance signal DY without using a HPF.

When using a HPF, an IIR type (infinite impulse response type) HPF is used. Evaluation values are divided into IIR0, IIR1, IIR3, and IIR4 according to the type of HPF; these represent HPFs having different respective cutoff frequencies. Thus, by setting HPFs having different cutoff frequencies, for example, by using a HPF having a high cutoff frequency in the vicinity of in-focus position, changes in the evaluation value can be increased compared with the case of using a HPF with a low cutoff frequency. Further, when the captured image is largely out of focus, changes in the evaluation value can be increased using a HPF with a low cutoff frequency compared with the case of using a HPF with a high cutoff frequency. In this manner, HPFs having different cutoff frequencies may be set according to the focusing state during auto-focus operation in order to select the optimal evaluation value.

Figure 4:
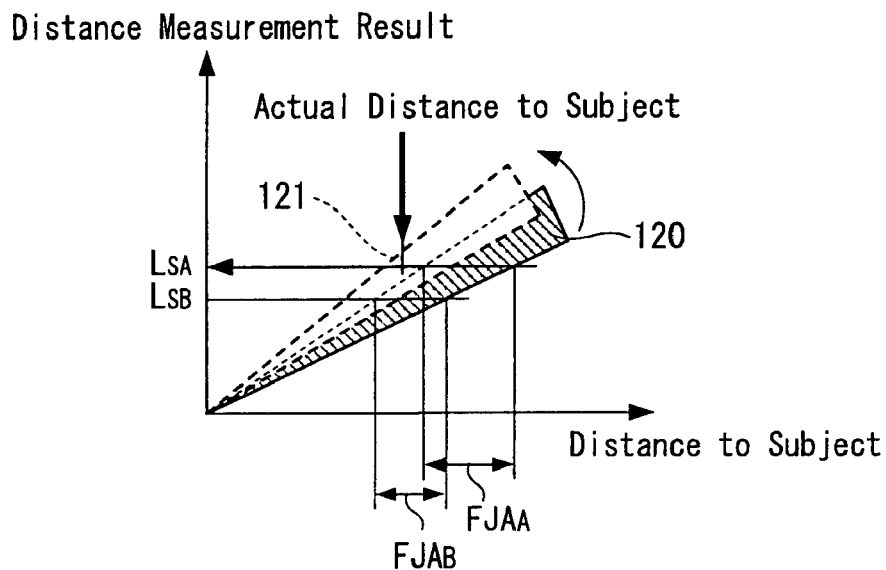
FIG. 4 shows a (second) relation between subject distance and distance measurement results according to an embodiment of the present invention; and, FIG. 5 is used to explain a (second) auto-focus operation using distance measurement results according to an embodiment of the present invention.

The evaluation frame size implies the size of the image region used in evaluation value generation. As shown in FIG. 4, five types of evaluation frame sizes, W1 to W5, may for example be provided; the center of each evaluation frame corresponds to the center of the captured image. In FIG. 4, the evaluation frame sizes W1 to W5 when the image size for one field is 768 pixels×240 pixels are illustrated.

Evaluation frame size W1: 116 pixels×60 pixels
Evaluation frame size W2: 96 pixels×60 pixels
Evaluation frame size W3: 232 pixels×120 pixels
Evaluation frame size W4: 192 pixels×120 pixels
Evaluation frame size W5: 576 pixels×180 pixels Thus, different evaluation values can be generated corresponding to the frame sizes by setting one of the plurality of frame sizes. Hence, an appropriate evaluation value can be obtained by setting one of the evaluation values ID0 to ID13, regardless of the size of the target subject.

Evaluation value calculation methods include the HPeak, HIntg, VIntg, and Satul methods. The HPeak system implies calculating horizontal evaluation values usby the peak system; the HIntg system includes calculating horizontal evaluation values by the whole integration system; the VIntg system involves calculating vertical-direction evaluation values by the integration system and the Satul system includes the number of saturated luminance.

Figure 5:
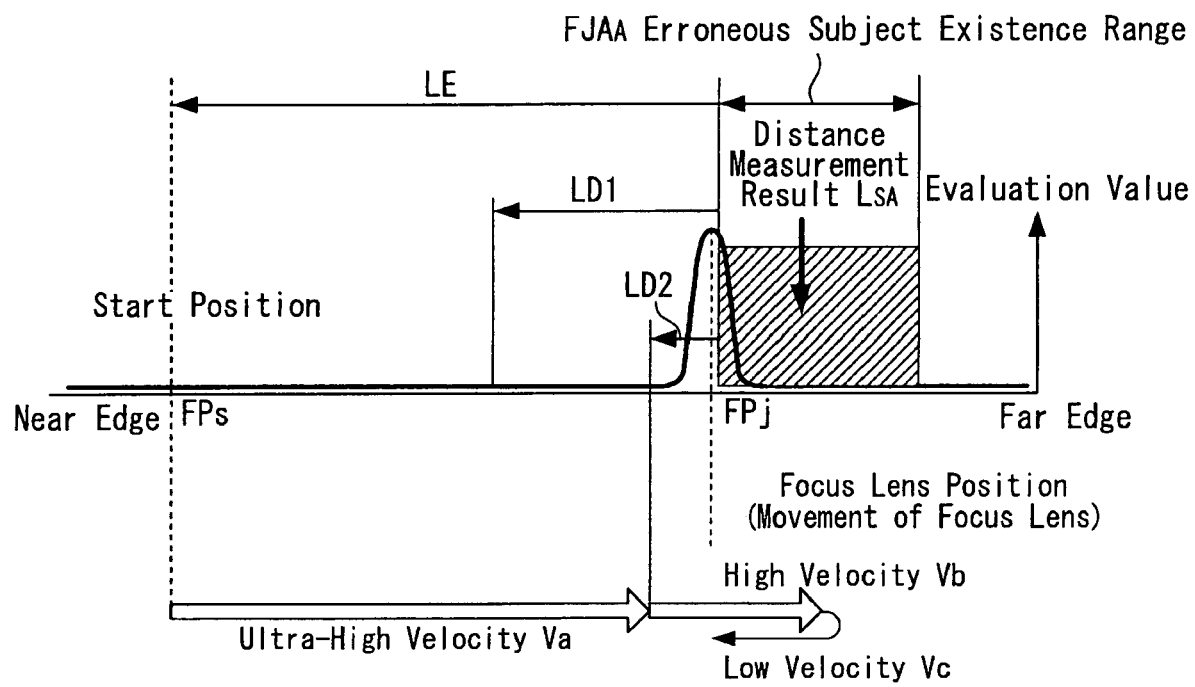

The HPeak method is an evaluation value calculation method in which a HPF is used to determine high-frequency components from horizontal-direction image signals, and is used to compute the evaluation values ID0, ID1, ID2, ID3, ID9, ID10, and ID11. FIG. 5 shows the configuration of a horizontal-direction evaluation value calculation filter used for the HPeak method. The horizontal-direction evaluation value calculation filter includes a HPF 31 that filters only high-frequency components from the luminance signals DY of the luminance signal generation circuit 21; an absolute value processing circuit 32 that selects the absolute values of the high-frequency components; a multiplication circuit 33 that multiplies the absolute values of the high-frequency components by the horizontal-direction frame control signals WH; a line peak hold circuit 34 that holds one peak value per line; and a vertical-direction integration circuit 35 that integrates the peak values for all the lines in the evaluation frame in the vertical direction.

The high-frequency components of the luminance signals DY are filtered by the HPF 31, and absolute values selected by the absolute value processing circuit 32. Subsequently, the horizontal-direction frame control signals WH are multiplied by the multiplication circuit 33 to obtain absolute values of high-frequency components within the evaluation frame. That is, if frame control signals WH the multiplication value of which is "0" outside the evaluation frame are supplied to the multiplication circuit 33, then only the absolute values of horizontal-direction high-frequency components within the evaluation frame are supplied to the line peak hold circuit 34.

Here, the frame control signals WH in the vertical direction form a square wave; however, the frame control signals WH in the horizontal direction do not merely include characteristics of a mere square wave but include characteristics of a triangular wave, so that the multiplied value of the frame control signals WH is reduced in the periphery of the frame (both ends). Thus, as the subject image within the frame approximates in-focus state, it is possible to reduce effects caused by the subject image interfering the external edges around the periphery of the frame (high luminance edges in the evaluation frame, including noise, drastic change, or the like of the evaluation values) or variability in the evaluation values caused by movement of the subject can be decreased. The line peak hold circuit 34 holds the peak values for each line. The vertical-direction integration circuit 35 adds peak values held for each line within the evaluation frame in the vertical direction, based on vertical-direction frame control signals WV, thereby obtaining the evaluation value. This method is called the HPeak method, because horizontal-direction (H) peaks are held temporarily.

Figure 10:
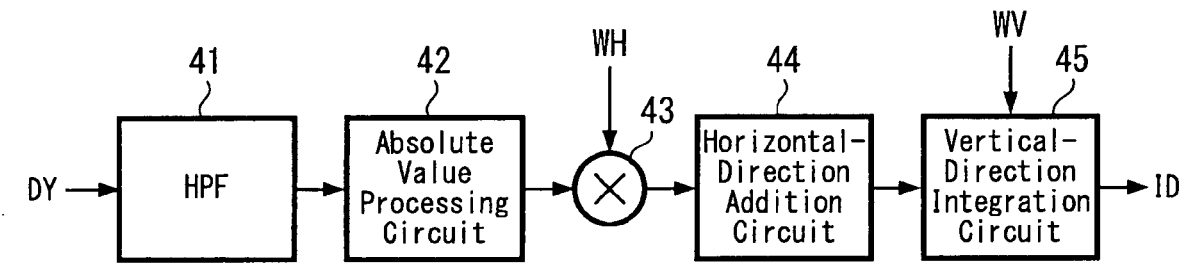
FIG. 10 shows the configuration of a total-integration type horizontal-direction evaluation value computation filter according to an embodiment of the present invention.

The HIntg method is defined as a total-integration type horizontal-direction evaluation value calculation method. FIG. 6 illustrates a configuration of a total-integration type horizontal-direction evaluation value calculation filter. This total-integration horizontal-direction evaluation value calculation filter is used in figuring out the evaluation values ID6, ID7, ID12, and ID13. Compared with the HPeak method horizontal-direction evaluation frame control signals WH calculation filter of FIG. 5, the HIntg method filter is configured to include a HPF 41, an absolute value processing circuit 42, and a multiplication circuit 43 the three units of which are similar to those from 31 to 33 in FIG. 10; but differs in that, in the horizontal-direction addition circuit 44 the absolute values of horizontal-direction high-frequency components in the evaluation frame are all added, and then, in the vertical-direction integration circuit 45, the addition results for all lines in the vertical direction in the evaluation frame are integrated in the vertical direction. Moreover, there is a difference between the HPeak method and the HIntg method in the following point; whereas in the HPeak method one peak value is determined per line, and the obtained peak values are added in the vertical direction, in the HIntg method the absolute values of horizontal-direction high-frequency components for each line are all added, and then the obtained high-frequency components are added in the vertical direction.

The HIntg method is divided into IIR1 and Y. The IIR1 employs high-frequency components as the data, whereas the Y employs original luminance signals DY. Luminance addition values are obtained by a luminance addition value calculation filter circuit, resulting by removing the HPF 31 from the total-integration type horizontal-direction evaluation value calculation filter of FIG. 6.

The VIntg method is a total-integration type vertical-direction evaluation value calculation method, used for obtaining the evaluation values ID4 and ID5. In both the HPeak method and the HIntg method, values are added in the horizontal direction to generate evaluation values; however, in the VIntg method, high-frequency components are added in the vertical direction to generate the evaluation values. For example, in a case of an image the upper half of which is white while the lower half is black, such as an image with a horizon or other scenes, so that there are only high-frequency components in the vertical direction but are no high-frequency components in the horizontal direction, the HPeak method horizontal-direction evaluation value does not function effectively. Hence the evaluation value in VIntg method is used in order that AF functions effectively for such scenes.

Figure 11:
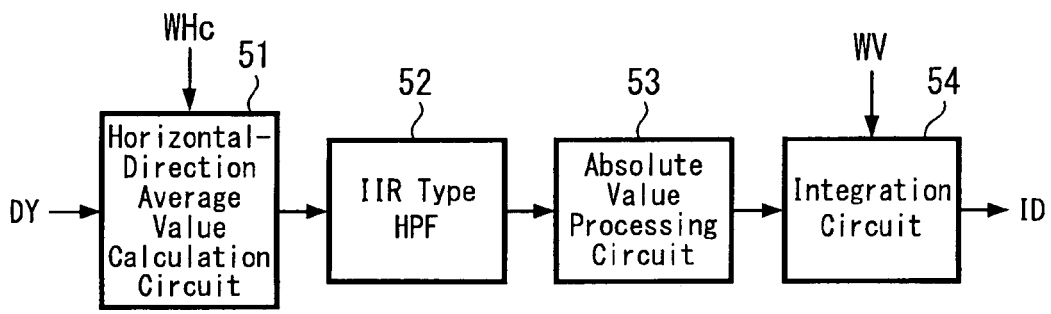
FIG. 11 shows the configuration of a vertical-direction evaluation value computation filter according to an embodiment of the present invention.

FIG. 11 illustrates a configuration of a vertical-direction evaluation value calculation filter that calculates vertical-direction evaluation values. The vertical-direction evaluation value calculation filter has a horizontal-direction average value calculation filter 51, an IIR-type HPF 52, an absolute value processing circuit 53, and an integration circuit 54. The horizontal-direction average value calculation filter 51 selects luminance signals of pixels (e.g., 64 pixels) in the center portion of the evaluation frame in the horizontal direction from the luminance signals DY for each line, based on a frame control signals WHc, computes the average value (or the total value) using the selected luminance signals. The horizontal-direction average value calculation filter 51 then outputs one result for one horizontal period. Here, the 64 pixels of the center portion are specified to be used to remove noise in the evaluation frame peripheral portion. In the vertical-direction evaluation value calculation filter, the luminance signals per 64 pixels are sequentially accumulated, and finally one average value of the luminance signals per 64 pixels is output, so that the vertical-direction evaluation value calculation filter may not need include a line memory, frame memory, or other memory device, resulting in a simple configuration. Subsequently, this horizontal-direction average value is synchronized with the line frequency and high-frequency components are filtered by the HPF 52, and the absolute value processing circuit 53 is used to convert the filtered high-frequency components into the absolute values of the high-frequency components. Further, the integration circuit 54 integrates over all lines within the evaluation frame in the vertical direction based on the vertical-direction frame control signal WV.

The Satul method is a calculation method in which the number of luminance signals DY that are saturated; that is, a luminance level equal to or above a prescribed level, within an evaluation frame is determined, and the outcome is used in calculating the evaluation values ID8. In calculating the evaluation values ID8, the luminance level of the luminance signal DY is compared with a threshold $\alpha$, and the number of pixels for which the luminance level of the luminance signal DY is equal to or above the threshold $\alpha$ in the evaluation frame is counted for each field, and the outcome is determined as the evaluation values ID8.

To return to a description of the configuration of the video camera shown in FIG. 6, the control unit 9 includes, for example, a CPU (Central Processing Unit), RAM (Random Access Memory) and ROM (Read-Only Memory), not shown; a computer program stored in ROM is read to RAM and performed, and by this means auto-focus operations or other prescribed control and processing is performed. Once for each field, the control unit 9 receives evaluation values computed by the evaluation value calculator 7, and irregularly receives distance measurement results from the distance measurement sensor 11, and uses these results to perform evaluation value peak search operations. The control unit 9 is connected to a user interface (not shown), and generates control signals based on operation signals supplied from the user interface and the like; by supplying the signals to each portion, control is performed so that operations of the video camera are performed based on the operation signals or the like.

This control unit 9 and the lens driver 2 of the lens block can communicate using a format, protocol and the like determined in advance, and the control unit 9 and lens driver 2 perform control of auto-focus operations in concert. As explained above, the lens driver 2 supplies various information (such as focus positions, iris values and the like) to the control unit 9, in accordance with requests, for example. Based on focus control signals, wobbling control signals and the like supplied from the control unit 9, lens driving signals are generated, and processing is performed to drive the focus lens 1 and wobbling lens. The control unit 9 generates and supplies the lens driver 2 with focus control signals to control driving of the focus lens 1 and wobbling control signals to control driving of the wobbling lens, based on evaluation values ID computed by the evaluation value calculator 7, distance measurement results Mag obtained by the distance measurement sensor 11, and various information read from the lens driver 2.

The lens driver 2 and control unit 9 may be configured integrally using a microcomputer, memory and the like, so as to perform auto-focus operations by reading and executing programs stored in nonvolatile memory.

The memory 10 is storage unit capable of being written and read by the control unit 9, and stores distance measurement results of the distance measurement sensor 11, focus positions of the focus lens 1, evaluation values computed by the evaluation value calculator 7, and other information. The memory 10 is configured as semiconductor memory or other nonvolatile memory.

The distance measurement sensor 11 includes a distance detection portion and an output circuit, and measures the distance to a subject upon an instruction from the control unit 9 and outputs a distance measurement result Mag to the control unit 9. In the control unit 9, the distance measurement result is used to identify the subject existence range, that is, the approximate distance, within a certain range, to the subject. The time for measurement by the distance measurement sensor 11 changes with the luminance of the subject. Also, when the distance cannot be measured, data indicating distance measurement is not possible (hereafter "distance measurement impossible data NG") is output as the distance measurement result Mag.

As the distance measurement sensor 11, either an active-type distance measurement sensor, which utilizes reflections when infrared rays, radio waves or the like are output to measure the distance to the subject, or a passive-type distance measurement sensor, which uses a sensor to detect luminance information for the subject and measure the distance to the subject based on shifts in luminance signals, degree of sharpness, and the like, can be employed. For example, one example of an active-type distance measurement sensor is a phase difference detection-type sensor. This phase difference detection method employs two sets of lens systems, each provided with a small lens and a line sensor, and the two lens systems are positioned with the optical axes shifted, to form a triangulation system.

The luminance addition value computation portion 8 is a circuit which integrates the luminance in a specific region (the center portion) of image signals captured by the image-capture device 3 to generate a luminance addition value. The luminance signals of the image signals in the specific region for each color, input from the image signal generator 5, are added, and the addition result is output as the luminance addition value to the control unit 9.

A video camera configured as described above can use the distance measurement results of the distance measurement sensor 11 to compute the focus position for switching the movement speed of the focus lens 1, advance the focus at ultra-high velocity up to this position, when the focus position for speed switching is reached reduce the velocity of focus movement, and utilize normal image processing employing evaluation values in auto-focus convergence operation to perform the auto-focus operation.

Figure 12A:
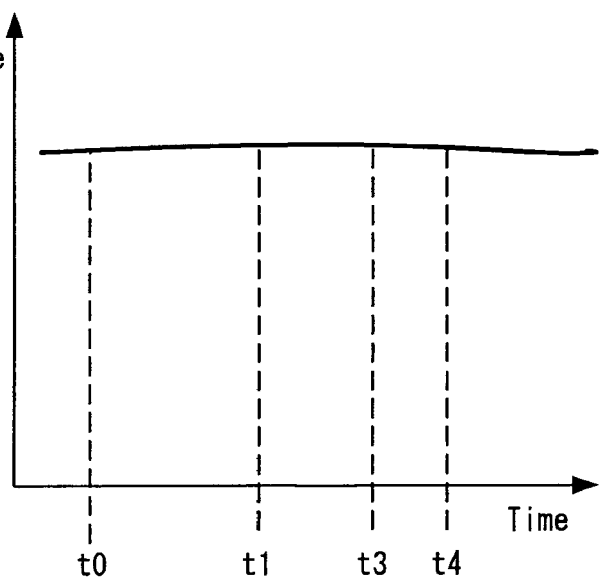
FIG. 12A, 12B, 12C show changes in the focus, evaluation value, and luminance addition value when auto-focus ends normally (under normal conditions) according to an embodiment of the present invention.
Figure 12B:
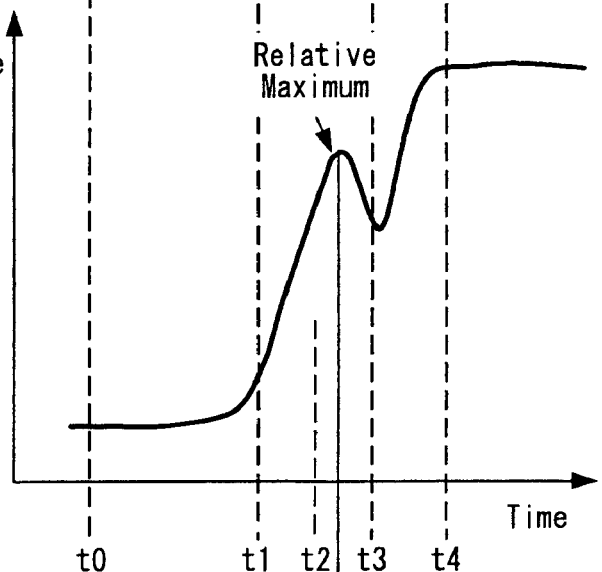
Figure 12C:
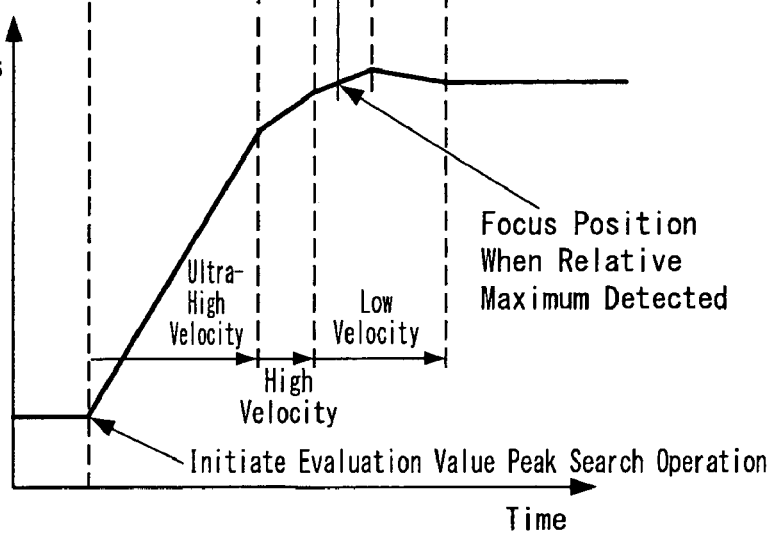

FIGS. 12A, 12B, 12C respectively illustrate fluctuations of luminance addition values, evaluation values, and focus while the focus lens of the video camera searches the position corresponding to a point at which the peak of the evaluation values is detected.

The vertical axes of the graphs 12A, 12B, and 12C respectively indicate the luminance addition values, the evaluation value, and movements of the focus lens, and the horizontal axes of three indicate time.

The curves shown on the graphs are plotted once for one field of the image signals or a plurality of data obtained on an irregular base. FIG. 12C shows that focusing is performed at an ultrahigh velocity in the time interval between t0 to t1, at a high velocity in the time interval between t1 to t2, and at a low velocity in the time interval between t2 to t3, and between t3 to t4 of the evaluation value peak search operation.

FIG. 12A shows that the luminance addition values hardly change despite the movement of the focus lens when imaging the subject with almost no wobbling by the video camera in a typical static manner. This results from the fact that the luminous flux that reaches a video camera does not generally fluctuate so much with a change in the state of focus.

By contrast, the evaluation value may change according to change in focus status. FIG. 12C shows the outcome while moving the focus lens between a point representing the initial increase and a point representing the detection of the relative maximum (between t0 and t3). After detecting the relative maximum (t3) using hill-climbing and hill-descending evaluations, the focus lens reverses a focus direction and returns the lens to the position corresponding to the point at which the relative maximum has been detected (t3 to t4).

When the focus lens returns to the position corresponding to the point at which the relative maximum has been detected, the evaluation value obtained is generally larger than the relative maximum as shown in FIG. 12B. In particular, the evaluation values obtained while moving the focus lens are generally smaller than the values obtained when the focus lens returns to and stops at the position corresponding to the point at which the relative maximum has been detected, because a change in the contrast of the subject image is generally small while moving the focus lens. That is, an accurate contrast cannot be obtained, because the focus lens is still moving at the position corresponding to the point at which the relative maximum is detected.

Accordingly, the evaluation value obtained when the focus lens returns to and stops at the position corresponding to the point at which the relative maximum has been detected is generally smaller than the evaluation value obtained while the focus lens is passing the focus position at which the relative maximum is detected.

Figure 13A:
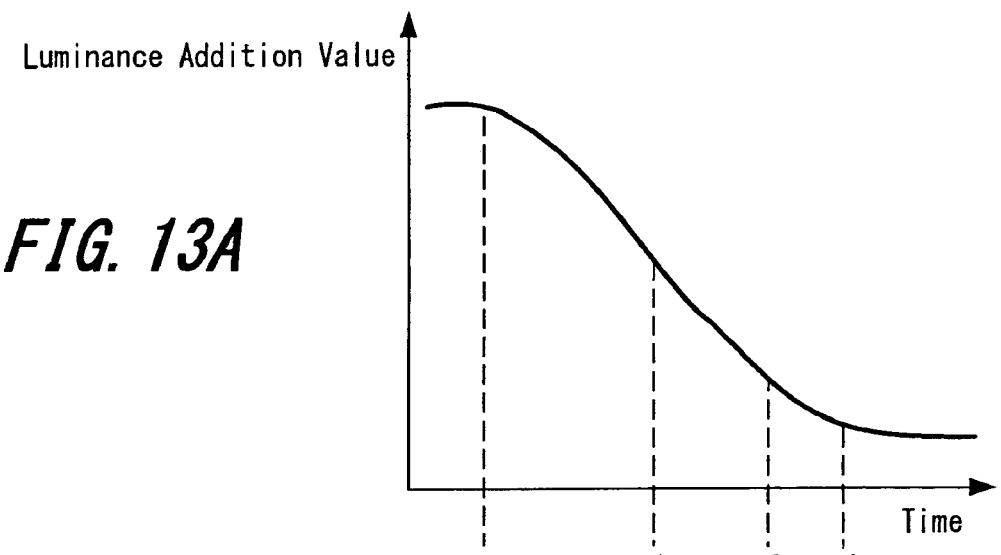
FIG. 13A, 13B, 13C show changes in the focus, evaluation value, and luminance addition value when auto-focus ends abnormally according to an embodiment of the present invention.
Figure 13B:
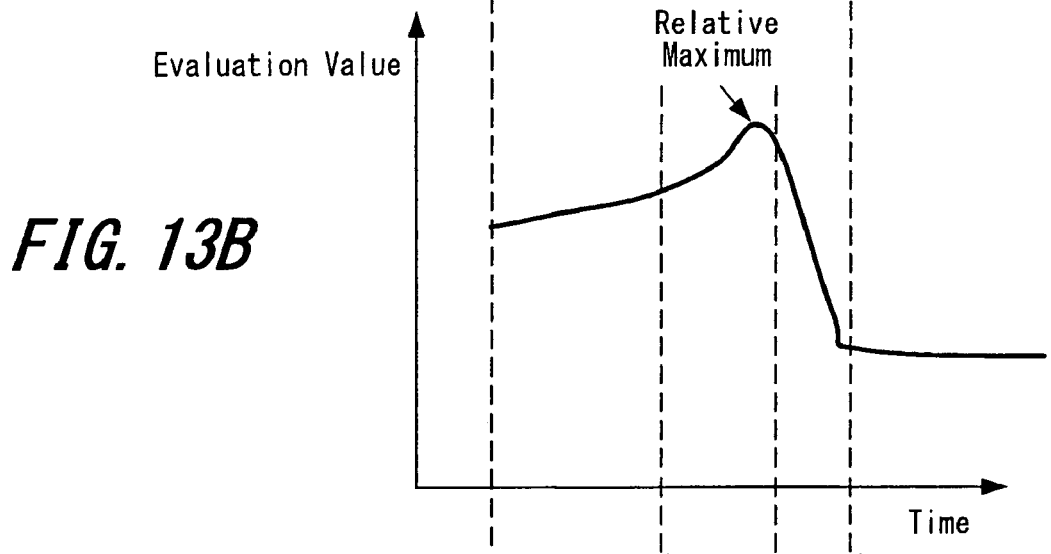
Figure 13C:
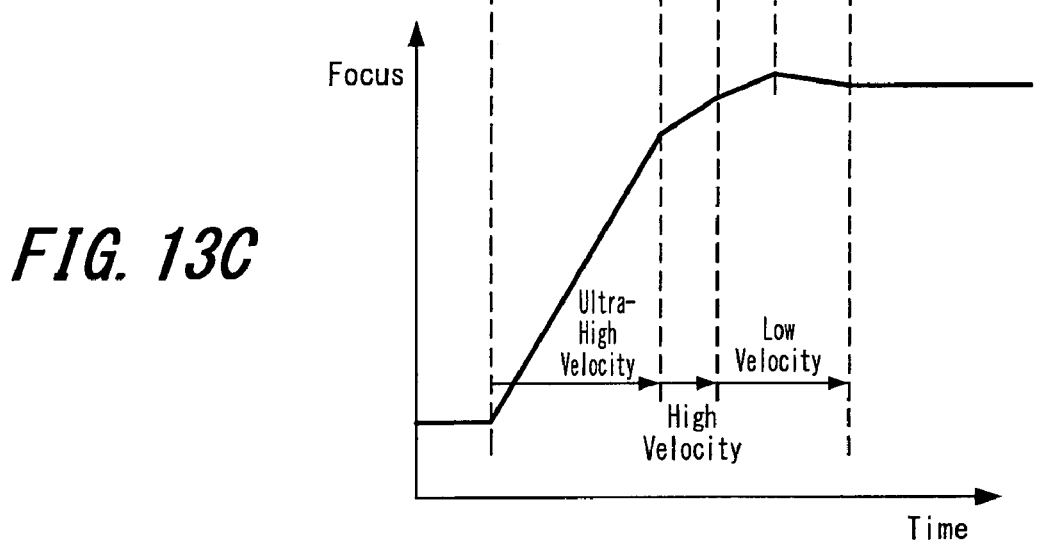

FIGS. 13A 13B, 13C respectively illustrate fluctuations of luminance addition values, evaluation values, and focus while the focus lens of the video camera searches the position corresponding to the peak of the evaluation values at which inaccurate focus may be determined. FIGS. 13A and 13B represent behaviors of the luminance addition values and the evaluation value when capturing an image with wobbling of the subject or wobbling of the video camera. FIG. 13B shows that the evaluation value is small while the subject image is out-of-focus although the focus lens returns to the position corresponding to the point at which the relative maximum has been detected. This results from generation of the inappropriate relative maximum obtained due to a change in the evaluation values while the subject or the video camera wobbles. In addition, the luminance addition values drastically change while the subject or the video camera wobbles as shown in FIG. 13A.

Hence in the first embodiment of the invention, by investigating the history of changes of the evaluation value as described above, a determination is made as to whether there has been convergence on the in-focus state in auto-focus operation, and when it is determined that there is convergence on the in-focus state, the focus position and distance measurement result of the distance measurement sensor are recorded, a correction amount for the distance measurement result of the distance measurement sensor is computed based on recorded data, and correction of the distance measurement result is performed.

In the correction method of the first embodiment of the invention, at the time of auto-focus operation convergence, the control unit 9 investigates the history of evaluation values, or of evaluation values and luminance addition values, and if prescribed conditions are satisfied ends the auto-focus operation normally, that is, determines that there has been convergence on the in-focus state. Upon determining that there has been a normal end (in-focus), the distance measurement result of the distance measurement sensor 11 and the focus position at the time of convergence are stored in memory 10. The prescribed conditions are explained below.

Figure 14:
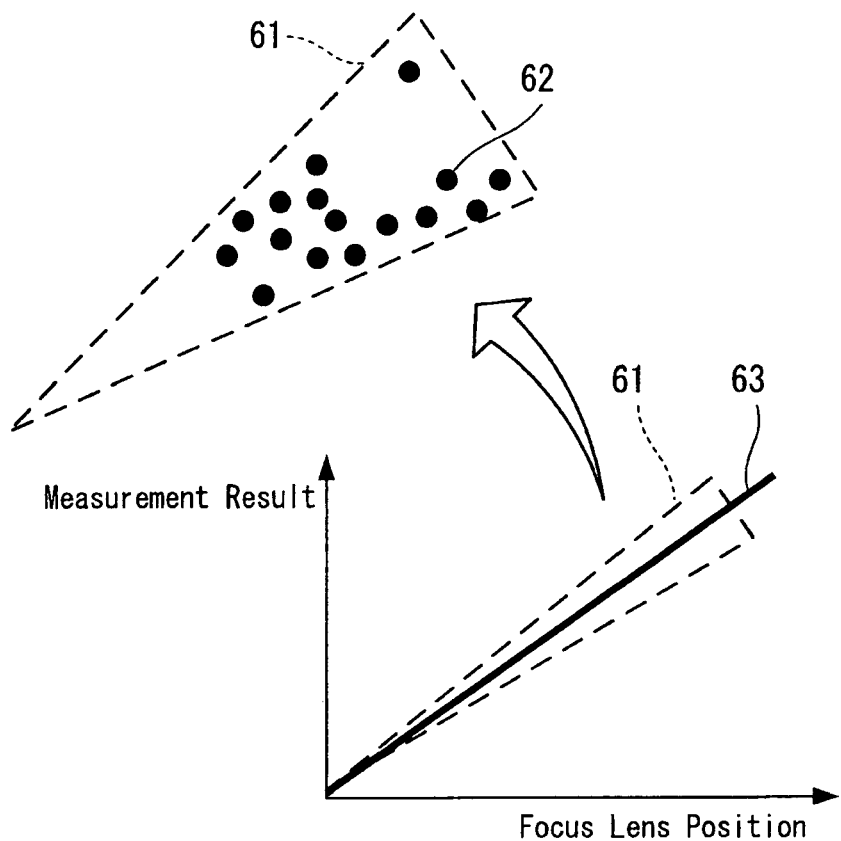
FIG. 14 shows the relation between distance measurement results and focus position according to an embodiment of the present invention.

After executing this operation a prescribed number of times (for example, 100 times), the data stored in memory 10 is analyzed, and the relation between the above distance measurement results and the above focus positions is identified. FIG. 14 shows the relation between distance measurement results and focus position. In FIG. 14, the measured-distance region 61 indicated by dashed lines indicates the range resulting from plotting a plurality of pairs of the above-described focus positions and distance measurement results (measurement points 62). In this example, the least-mean squares method is used to determine the straight line 63 passing substantially through the center of this range. This straight line 63 represents the relation, used for correction, between the distance measurement results and the focus positions. By using this relation, distance measurement results can be corrected even when changes with aging occur in the distance measurement results of the distance measurement sensor 11.

In the above-described correction method, a correction method was explained in which a least-mean-squares straight line is used; but a spline curve or the like can be determined and used as well. When using a straight line or a curve, an equation or an approximating equation can be used for representation, and the equation can be used as a correcting equation. On the other hand, instead of using an equation, a ROM table (also called a lookup table) can be used to describe the relation as well. In the case of a ROM table, focus positions and distance measurement results are related only through discrete values; but values intermediate between discrete data values can be determined by linear interpolation.

Here, conditions used as determination criteria for the above-described in-focus state are explained. In this example, three conditions B, B and B are proposed. Condition B is a condition for determining whether an auto-focus operation has ended normally.

Condition A

If the evaluation value relative maximum is ea, and the evaluation value when the focus is returned to the focus position corresponding to the point at which the relative maximum is detected and the focus is stopped is eb, then this in-focus condition is met when the value resulting by dividing the evaluation value eb by the relative maximum value ea is larger than a prescribed threshold. This can be represented by the following equation.

$$\alpha \geq eb/ea \qquad 1$$

where $\alpha$ is a constant

The value of $\alpha$ is determined through tests and experiments.

Figure 15:
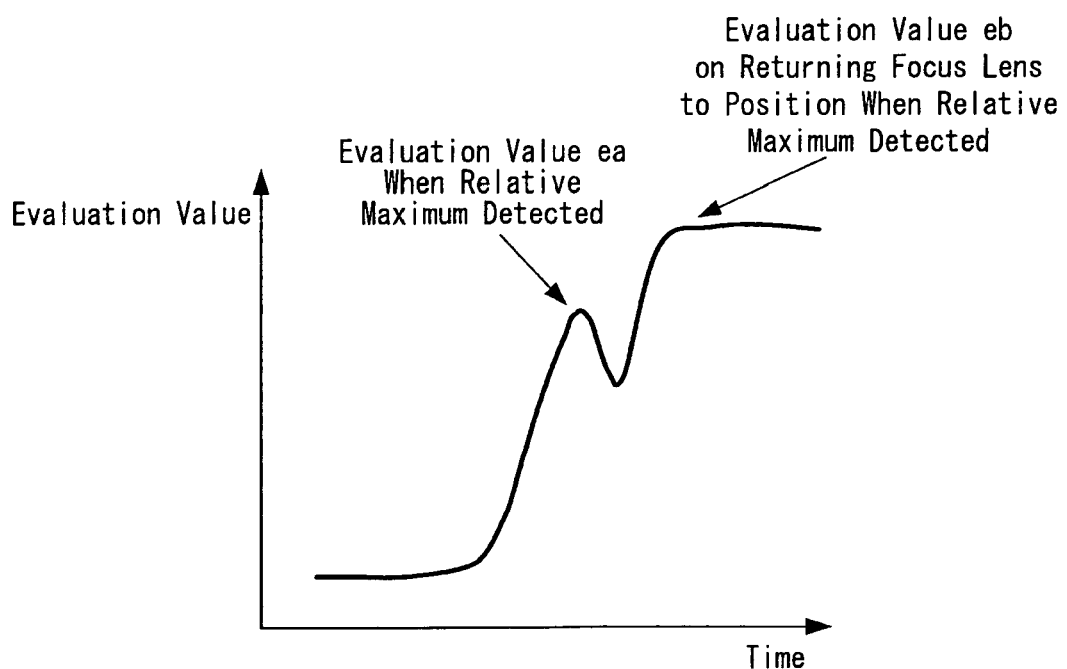
FIG. 15 shows a (first) example of evaluation values enabling determination of the in-focus state according to an embodiment of the present invention.

For example, as shown in FIG. 15 (the same as in FIG. 12B), when the value obtained by dividing the evaluation value eb by the relative maximum value ea is larger than the prescribed threshold (when equation 1 is satisfied), the state is determined to be the in-focus state.

Figure 16:
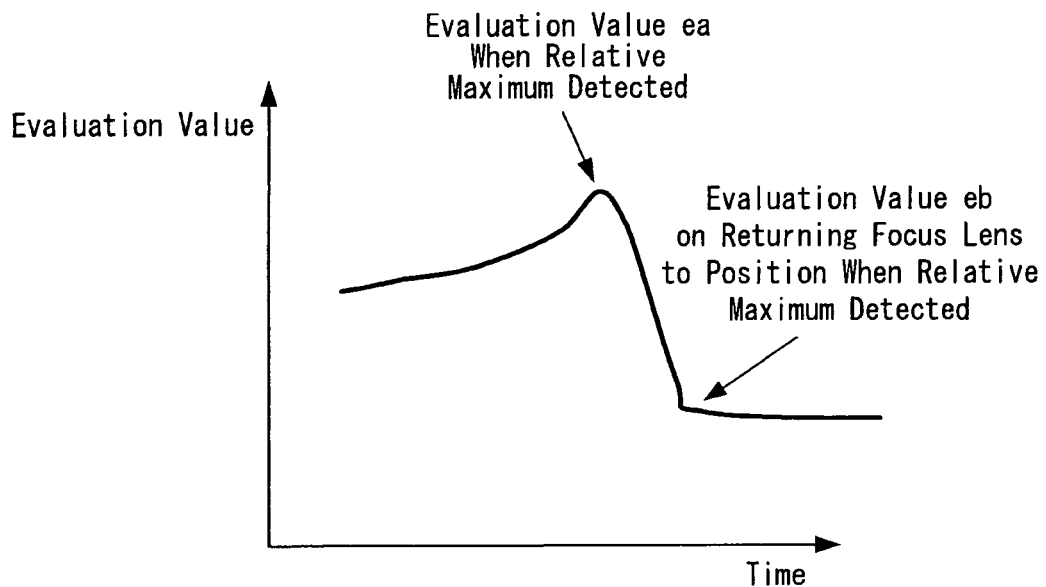
FIG. 16 shows an example of evaluation values not enabling determination of the in-focus state according to an embodiment of the present invention.

On the other hand, as shown in FIG. 16 (the same as in FIG. 13B), when the value obtained by dividing the evaluation value eb by the relative maximum value ea is smaller than or equal to the threshold, $$\alpha \geq eb/ea \qquad 1$$

then equation 1 is not satisfied, and so the state is determined not to be the in-focus.

When using this condition B to determine the in-focus state, the relation between the evaluation value at the relative maximum and the evaluation value when the focus is returned to the focus position when the evaluation value peak is detected is analyzed, and the sureness with which the focus can be regarded in the in-focus state is determined, so that accurate determination results which take into account fluctuations in the evaluation value arising from the fact that the focus is moving can be obtained.

Next, a condition B for the in-focus state is explained. Condition B further limits the above condition B, and is a stricter condition for determining the sureness of the in-focus state.

Condition B

When the evaluation value relative maximum is ea, and the evaluation value upon returning the focus to the focus position when the relative maximum is detected and holding the focus stationary is eb, this condition for the in-focus condition is met when the value obtained by dividing the evaluation value eb by the relative maximum ea is larger than a first threshold, and in addition the evaluation value eb is larger than a second threshold. This may be expressed using equations as below. In this example, if equation 1 and equation 2 are not satisfied simultaneously, then the state is not determined to be the in-focus state.

$$\alpha < eb/ea \qquad 1$$

where $\alpha$ is a constant $$eb > \beta \qquad 2$$

where $\beta$ is a constant

In condition B, it is also required as a condition that the evaluation value eb of equation 2 be greater than a prescribed magnitude $\beta$. This is because the objective is to use only subject data with high contrast to correct the distance measurement results with high reliability. When in equation 2 the evaluation value is greater than the prescribed value, the magnitude of $\beta$ is chosen such that the subject contrast is high.

Figure 17:
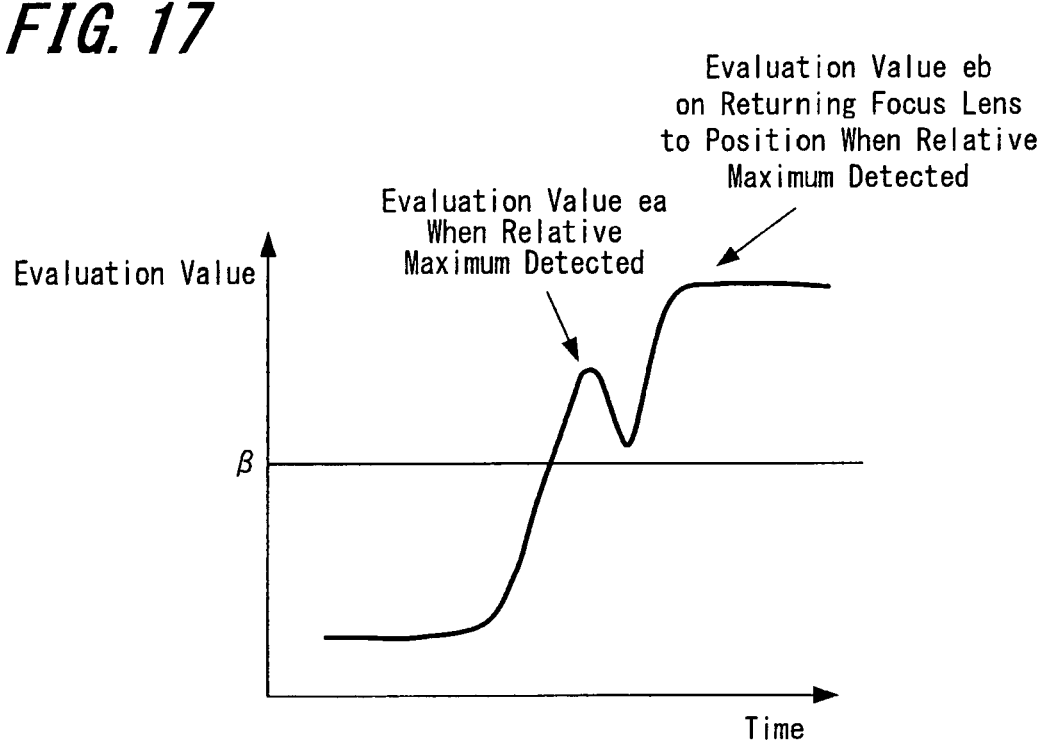
FIG. 17 shows a (second) example of evaluation values enabling determination of the in-focus state according to an embodiment of the present invention.

For example, as shown in FIG. 17, when the value obtained by dividing the evaluation value eb by the relative maximum ea is greater than the prescribed threshold (when the condition of equation 1 is satisfied), and when moreover the evaluation value eb is greater than the prescribed value $\beta$, then the state can be determined to be a in-focus state.

Next, the condition B for the in-focus state is explained. Condition B further adds to the above condition B a condition relating to luminance, so that there is no physical movement. The condition is expressed using equations below. In this example, if the equations 1, 2 and 3 are not simultaneously satisfied, the state is not determined to be a in-focus state.

Condition B

Figure 18A:
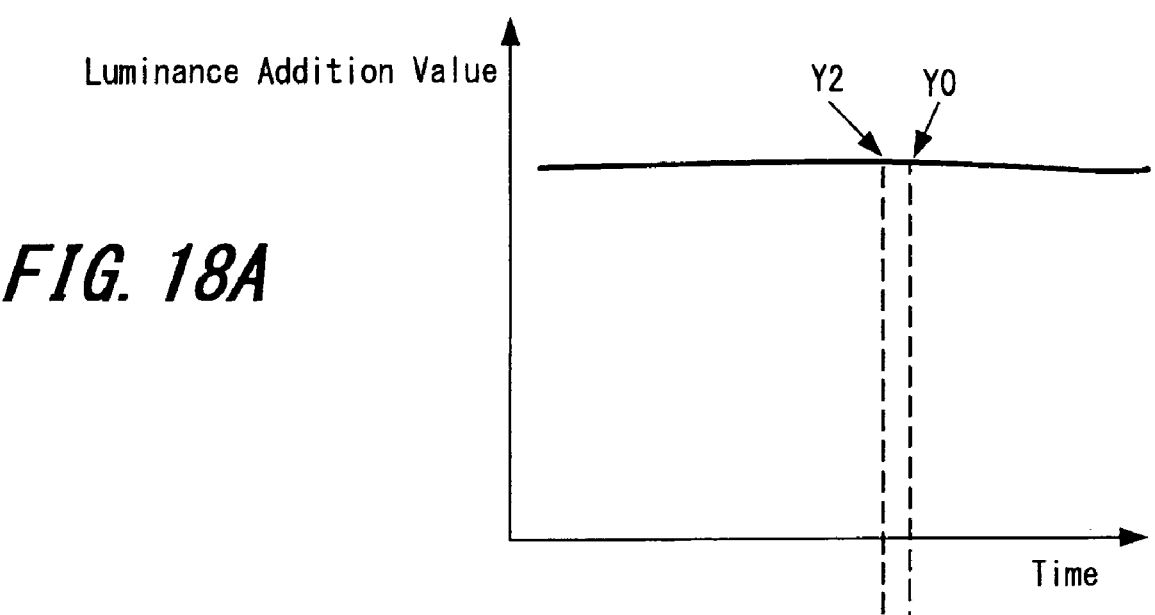
FIG. 18 is used in a description of in-focus determination, taking into consideration evaluation values and luminance addition values according to an embodiment of the present invention.
Figure 18B:
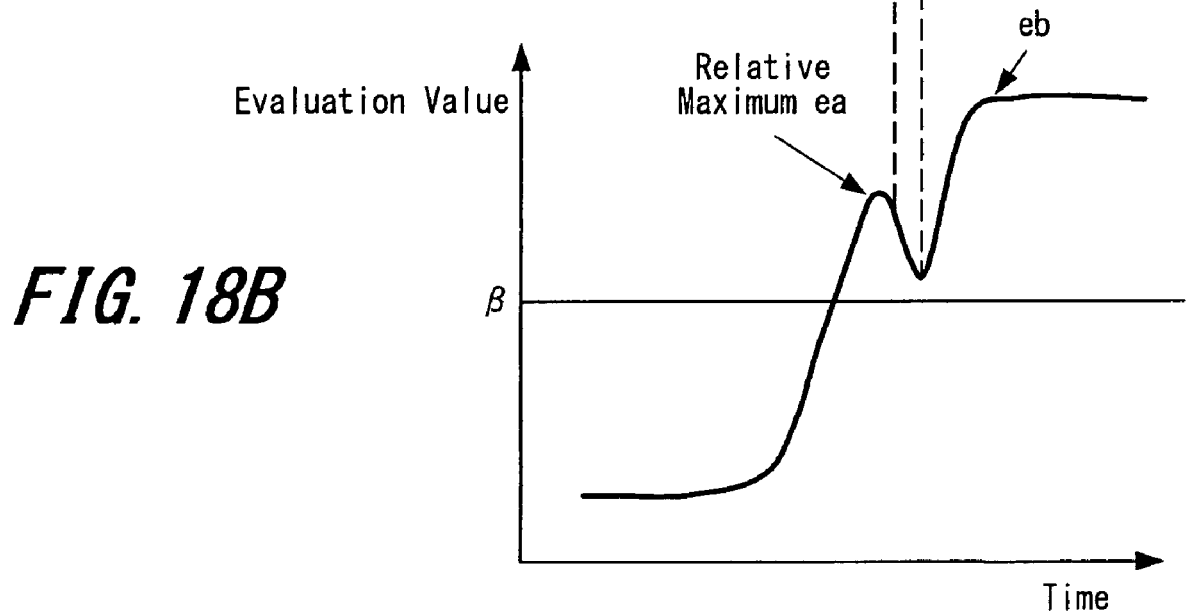

When the evaluation value relative maximum is ea, and the evaluation value upon returning the focus to the focus position when the relative maximum is detected and holding the focus stationary is eb, this condition for the in-focus condition is met when the value obtained by dividing the evaluation value eb by the relative maximum ea is larger than a first threshold, and in addition the evaluation value eb is larger than a second threshold. In addition, as shown in FIG. 18, at the time of detection of an evaluation value peak, if the current field luminance integration value is Y0 and the luminance addition value for the second field before the current field is Y2, then the value obtained by dividing the luminance addition value Y0 for the current field by the luminance addition value for two fields before must be within a prescribed range. This can be expressed using equations as follows.

$$\alpha < eb/ea \qquad 1$$

where α is a constant $$eb > \beta \qquad 2$$

where β is a constant $$\gamma 1 < Y2/Y0 < \gamma 2 \qquad 3$$

where γ1 and γ2 are constants (γ1<γ2)

This condition B includes a condition (equation 3) of determining whether or not changes in luminance are within a prescribed range. If this condition is not satisfied (see for example in FIG. 13A), then it is determined that the subject has moved, or that movement of the video camera or the like has occurred, and the distance measurement result and focus position are not recorded. In this way, the effect of movement of the subject, movement of the video camera, and the like is excluded when determining the in-focus sate, so that accurate determination results are obtained. Hence the correction amount for distance measurement results can be computed more accurately. In this example, a luminance addition value used in equation 3 is a luminance addition value for two frames previous; but other methods are possible, and the luminance addition value for an appropriate prescribed previous field can be used. The above values γ1 and γ2 are determined appropriately through tests and experiments.

Further, equation 1, equation 2 and equation 3 can be combined arbitrarily together with the performance of the distance measurement sensor 11 and other conditions as conditions for determination of the in-focus state.

Figure 19:
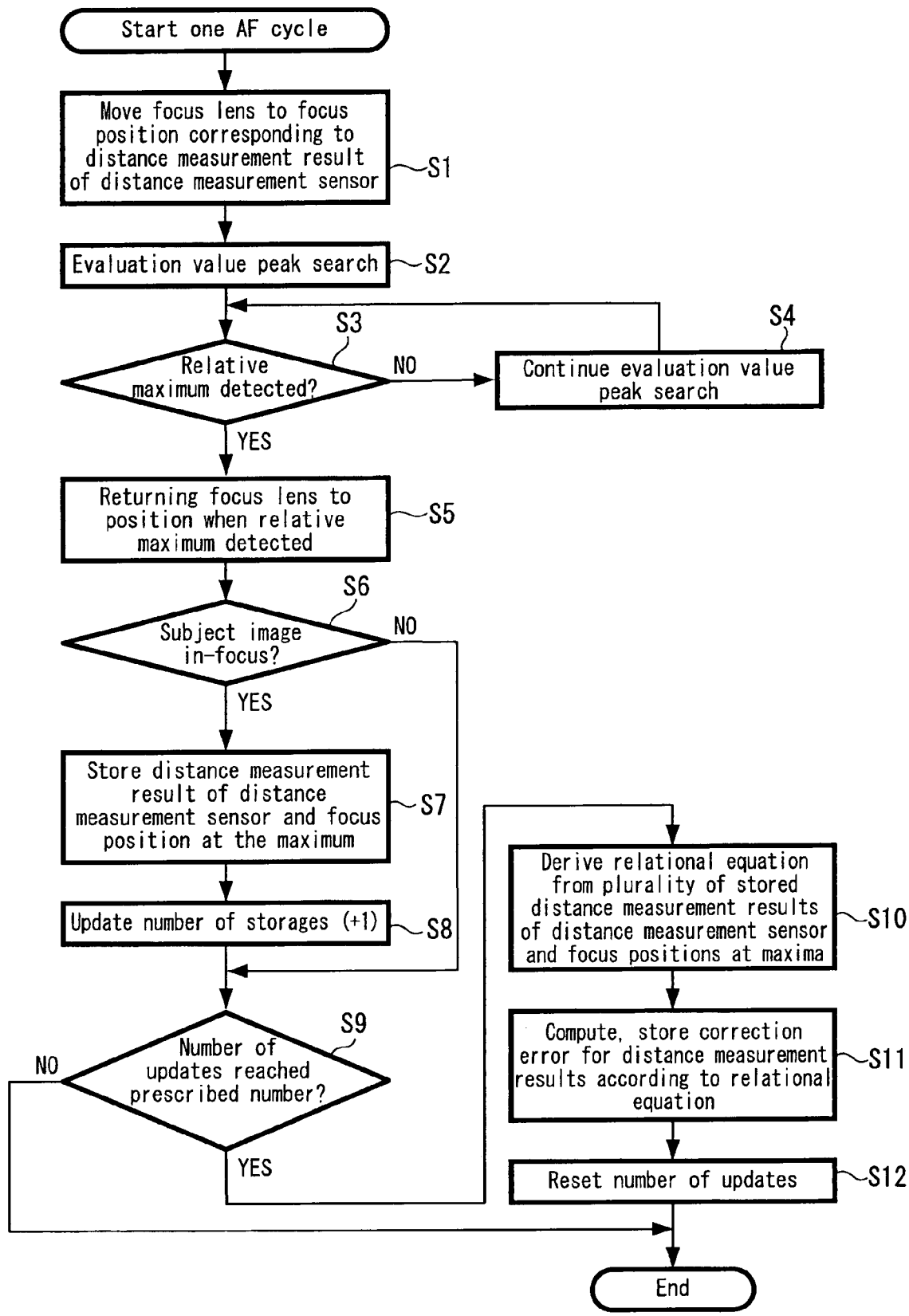
FIG. 19 is a flowchart showing distance measurement result correction processing according to an embodiment of the present invention.

Next, processing by the video camera to compute the correction amount for distance measurement results of the distance measurement sensor is explained, referring to the flowchart of FIG. 19. In this correction amount computation processing, shifts in distance measurement results of the distance measurement sensor due to changes with aging and the like are corrected, according to the above in-focus determinations, in auto-focus operations combining the distance measurement results of the distance measurement sensor 11 and evaluation values obtained in image processing by the evaluation value calculator 7.

In FIG. 19, the video camera control unit 9 (see FIG. 6) starts one cycle of the auto-focus operation, either with prescribed timing or by means of an operation signal from an operation unit or some other trigger, and moves the focus to the focus position corresponding to the measurement result of the distance measurement sensor 11 (step S1).

Specifically, the control unit 9 causes the distance measurement sensor 11 to measure the distance to the subject, and the distance measurement result Mag is read from the distance measurement sensor 11. Next, the control unit 9 detects the current focus position based on the detection signal from the position detector 1a. Then, the control unit 9 performs lens driving setting processing. In lens driving setting processing, the movement direction and movement velocity of the focus lens 1 are set based on the current in-focus position FPj and the distance measurement result Mag.

Figure 20:
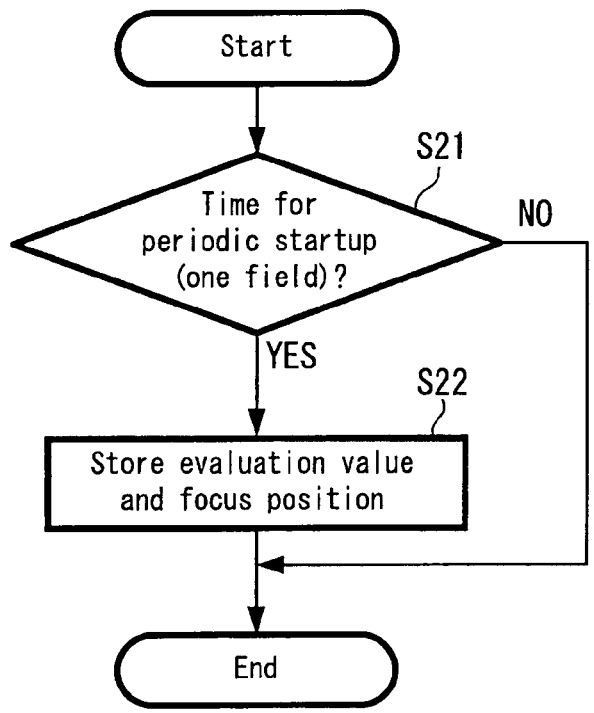
FIG. 20 is a (first) flowchart showing background processing according to an embodiment of the present invention.

The control unit 9 performs processing to store evaluation values and focus positions in the background. As shown in FIG. 20, the control unit 9 determines whether a periodic startup time has arrived, based on a synchronization signal contained in the image signals, or on a reference signal input from a reference signal generation portion (not shown) (step S21). The fixed period in this example is taken, as an example, to be one field. Then, when the control unit 9 determines that the startup time has arrived, the AF1 cycle operation is started, and the evaluation value computed by the evaluation value calculator 7 and the focus position are stored in memory 10 (step S22). In the determination processing of step S21, if the control unit 9 determines that the periodic startup time has not arrived, then processing ends.

Figure 21:
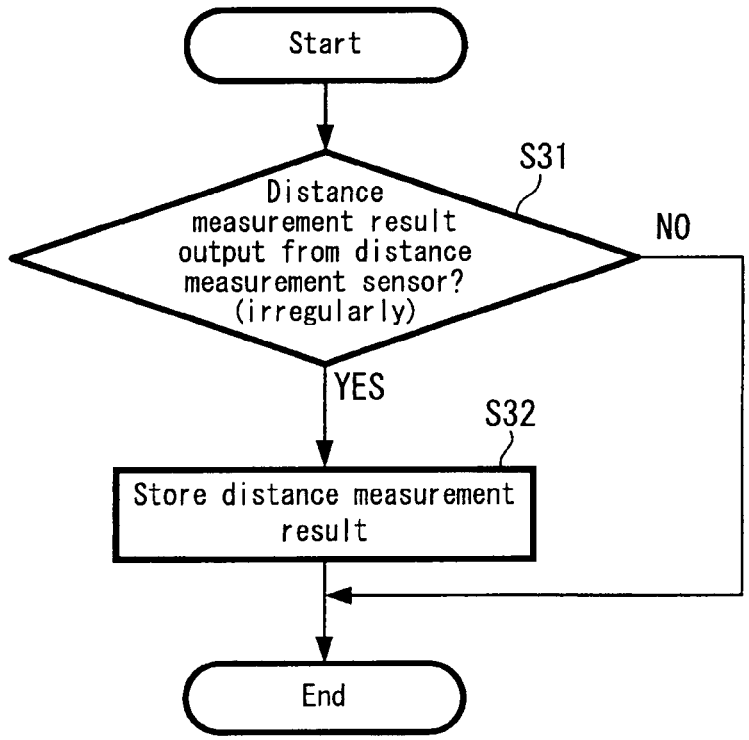
FIG. 21 is a (second) flowchart showing background processing according to an embodiment of the present invention.

Further, the control unit 9 performs processing to store the distance measurement results of the distance measurement sensor 11 in the background. As explained above, distance measurement operation of the distance measurement sensor 11 changes depending on the luminance of the subject and other factors, and so there are cases in which realtime accommodation of the auto-focus operation is not possible in each cycle; hence distance measurement data is stored in advance. As shown in FIG. 21, the control unit 9 determines whether distance measurement results have been output from the distance measurement sensor 11 (step S31). At this time, distance measurement processing may be performed irregularly. Then, the control unit 9 receives distance measurement data from the distance measurement sensor 11 and stores the data in memory 10 (step S32). In the determination processing of step S31, if output from the distance measurement sensor 11 is not obtained by the control unit 9, processing ends.

Figure 22:
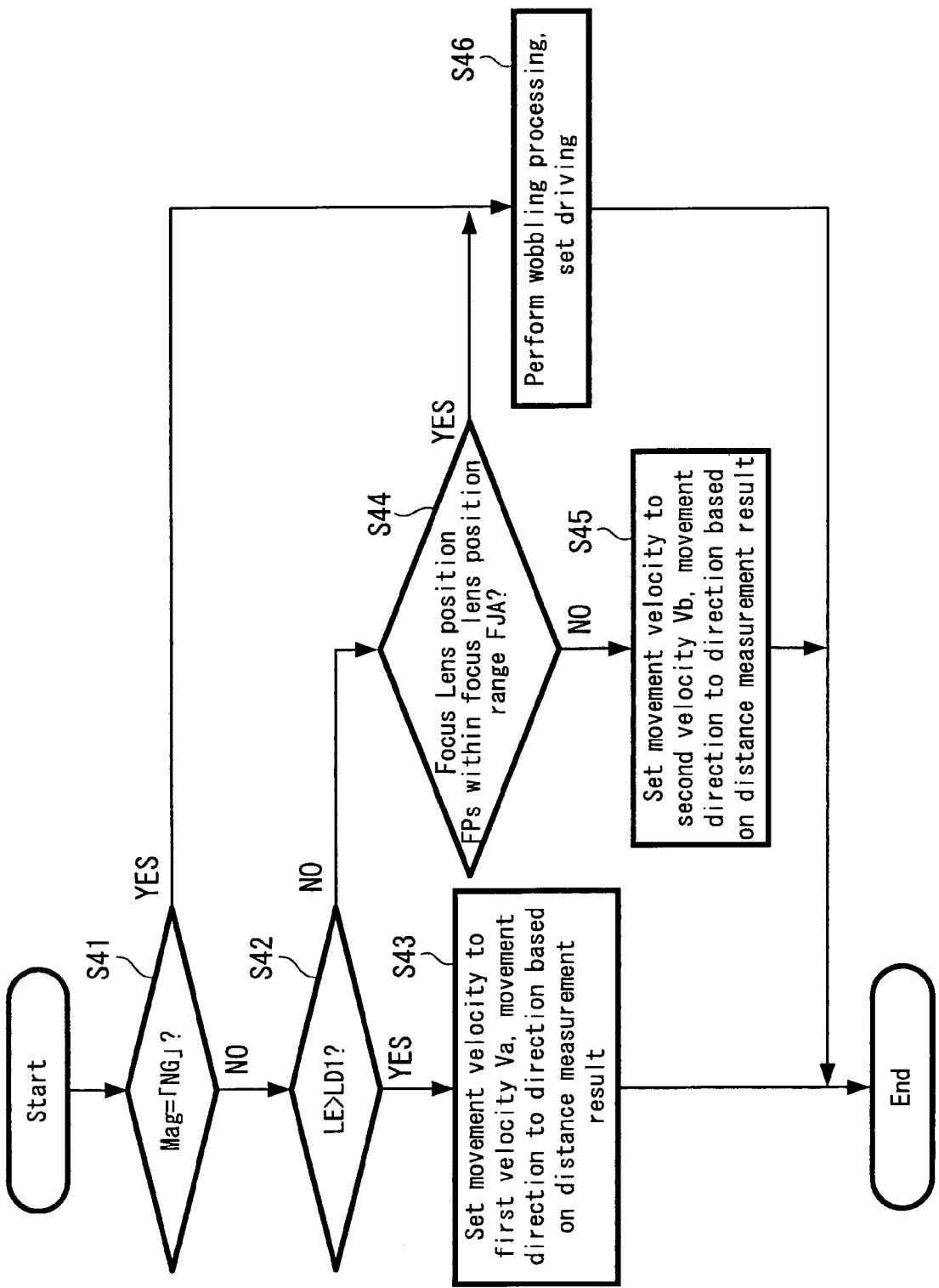
FIG. 22 is a flowchart showing lens driving setting processing according to an embodiment of the present invention.

Here, lens driving setting processing, mentioned above in the explanation of step S1, is explained. FIG. 22 is a flowchart showing the lens driving setting processing. This lens driving setting processing uses the distance measurement results of the distance measurement sensor 11 to compute the focus position at which to switch the movement speed of the focus lens, and sets the movement speed and direction of the focus lens 1 (see FIG. 3).

In FIG. 22, the control unit 9 determines whether the distance measurement result Mag is "distance measurement impossible data" NG (step S41). Here, if the distance measurement result Mag is not "distance measurement impossible data" NG, processing proceeds to step S42; if the distance measurement result Mag is "distance measurement impossible data" NG, processing proceeds to step S46.

When the distance measurement result Mag is not "distance measurement impossible data" NG, the control unit 9 determines whether the current focus position FPs (see FIG. 3) is further than the first determination distance LD1 from the subject existence range FJA based on the distance measurement result Mag (step S42). Here, if the distance LE from the current focus position FPs to the subject existence range FJA based on the distance measurement result Mag is greater than the first determination distance LD1, processing proceeds to step S43, and if equal to or less than the first determination distance LD1, processing proceeds to step S44.

The subject existence range FJA is set with respect to distance measurement results Mag such that the in-focus position FPj for the subject corresponding to the distance measurement results Mag is contained therein. For example, the subject existence range FJA may be taken to be the distance measurement error range for the distance measurement results Mag. Or, the range may be set to be broader than the distance measurement error range for the distance measurement results Mag.

The determination distance LD1 is set taking the control characteristics of the focus lens 1 into account. That is, when moving the focus lens at a first velocity (ultra-high velocity) Va, described below, if the determination distance LD1 is short, the in-focus position FPj is approached before reaching the first velocity Va. And, when the movement velocity of the focus lens 1 is fast, a long time is required to stop the focus lens 1, so that when the in-focus position FPj is approached, the in-focus position FPj is detected even when an attempt is made to halt the focus lens 1, possibly resulting in a focusing operation with a sense of unnaturalness. Hence the determination distance LD1 is set according to the relative maximum speed and control characteristics when moving the focus lens 1.

Further, the relative maximum speed and control characteristics are different depending on the focal distance and iris value, and so the determination distance LD1 is adjusted according to the focal distance and iris value. When the focal distance is short, and when the iris opening amount is small, the depth of field is deep. On the other hand, when the focal distance is long and when the iris opening amount is large, the depth of field is shallow.

When the depth of field is deep, the change in evaluation value when the focus lens 1 is moved is gradual, and the evaluation value peak region is broad. Hence the determination distance LD1 is made large, so that the focus lens 1 is not moved at the first velocity Va in the portion in which the evaluation value changes. In addition, even when the determination distance LD1 is made large and the time interval over which the focus lens 1 is moved at the first velocity Va is short, because of the large depth of field, a captured image with minimal or no blurring can be rapidly obtained.

On the other hand, when the depth of field is shallow, the change in evaluation value when the focus lens 1 is moved is rapid, and so the evaluation value peak region is narrow. Hence even when the determination distance LD1 is short, the focus lens 1 can be kept from moving at the first velocity Va in the portion in which the evaluation value changes. Also, by making the determination distance LD1 short, the time period over which the focus lens 1 is moved at the first velocity Va becomes longer, and in this case also a captured image with minimal or no blurring can be rapidly obtained.

In the determination processing of step S42, when the distance LE from the current focus position FPs to the subject existence range FJA is longer than the first determination distance LD1, because the current focus position FPs is more distant than the determination distance LD1 from the subject existence range FJA, the control unit 9 sets the movement velocity of the focus lens 1 to the first velocity Va. By this unit, the focus position FPs can be made to rapidly approach the in-focus position FPj. In addition, the direction of movement of the focus lens 1 is set such that the focus position FPs moves in the direction based on the distance measurement results Mag, that is, the direction of the focus position indicated by the distance measurement results Mag (the rightward direction in FIG. 3) (step S43).

Based on the distance measurement results Mag of the distance measurement sensor 45, the movement direction of the focus lens 1 can be correctly determined, and so wobbling need not be performed to determine the movement direction.

The purpose of the first velocity Va is to cause the focus position to rapidly approach the in-focus position; because the evaluation value is only updated once per field, there is no need to limit the movement velocity such that the evaluation value peak is never detected. Hence the first velocity Va is set to the fastest permissible velocity when driving the focus lens 1.

In the determination processing of step S42, when the distance LE from the current focus position FPs to the subject existence range FJA is equal to or less than the first determination distance LD1, the control unit 9 determines whether the current focus position FPs is within the subject existence range FJA (step S44). Here, when the current focus position FPs is not within the subject existence range FJA, processing proceeds to step S45, but when the current focus position FPs is within the subject existence range FJA, processing proceeds to step S46.

In the determination processing of step S44, when the current focus position FPs is within the subject existence range FJA, the control unit 9 sets the movement velocity of the focus lens 1 to a second velocity (high velocity) Vb, which is slower than the first velocity (ultra-high velocity) Va. The movement direction is set to the direction based on the distance measurement results Mag, that is, such that the focus position FPs moves in the direction of the focus position indicated by the distance measurement results Mag (rightward in FIG. 3) (step S45).

This second velocity Vb is set such that there are no obstacles when switching velocity from the second velocity Vb to a third velocity Vc slower than the second velocity Vb due to the occurrence of collapse in the evaluation value curve indicating changes in the evaluation value when the focus lens 1 is moved. For example, when the depth of focus is Fs, the second velocity Vb is set to 12 Fs/field. The third velocity Vc is a velocity at which the evaluation value peak can be detected with good accuracy, and is for example set to 2 Fs/field. When the fastest permissible velocity when driving the focus lens 1 is 12 Fs/field or lower, the first velocity Va and second velocity Vb are set to the same value.

Upon advancing from step S41 or step S44 to step S46, the control unit 9 performs wobbling similarly to the related art, and based on the change in evaluation value when the wobbling lens is moved, sets the movement direction for the focus lens 1. Also, the movement velocity of the focus lens 1 is set to the second velocity Vb. When the distance from the current focus position FPs to the destination focus position is short, the current focus position FPs is close to the in-focus position FPj, and so the movement velocity of the focus lens 1 may be set to the third velocity Vc.

Upon completing the processing of any one of the steps S43, S45 or S46, the control unit 9 performs lens driving processing, and when lens driving processing is completed advances to step S2. In this lens driving processing, switching of the movement velocity of the focus lens 1, and hill-climbing control processing similar to that of the related art is performed, after which the focusing operation is performed to cause the focus position FPs to be moved to the in-focus position FPj.

In switching of the movement velocity, when the distance from the focus position FPs to the above-described subject existence range FJA is shorter than a second determination distance LDs, which is shorter than the determination distance LD1, then the movement velocity is switched from the first velocity Va to the second velocity Vb. Here, the determination distance LD2 is set such that, at a position which for example is distant by the determination distance LD2 from the subject existence range FJA, when the movement velocity is switched from the first velocity Va to the second velocity Vb described below, the movement velocity is decelerated to the second velocity Vb in the subject existence range FJA. By setting such a value, passing of the evaluation value peak due to a small evaluation value in the subject existence range FJA can be prevented.

In hill-climbing control processing, changes in an evaluation value computed by the evaluation value calculator 7 are detected, and the focus position FPs is moved such that the evaluation value becomes a relative maximum, to seek the in-focus position FPj. In hill-climbing control processing using this evaluation value, the focus lens 1 is moved such that, for example, the above-described evaluation values ID0, ID2 or the like are relative maximum. Also, when the number of high-luminance pixels is increased, the evaluation value ID8 is used to switch from the evaluation frame size W1 to the evaluation frame size W5 and evaluation values are computed, in order that the focus lens 1 does not move in the direction in which blurring occurs. Further, by using the evaluation value ID0 and other evaluation values ID1 to ID7 and ID9 to ID13, lens movement velocity switching, determinations of subject movement, back-feed determination, determinations of arrival of the lens at the near edge or far edge (see FIG. 3), and the like are performed, and based on determination results the operation of driving the focus lens 1 is controlled so as to perform focusing with good accuracy. In this way, hill-climbing control processing is performed, and focusing operation to cause the focus position FPs to seek the in-focus position FPj is completed.

By means of the above-described auto-focus operation, when the current focus position FPs is more distant from the subject existence range FJA than the first determination distance LD1 based on the distance measurement results Mag, that is, when the distance LE from the current focus position FPs to the subject existence range FJA based on the distance measurement results Mag is larger than the first determination distance LD1, the focus lens 1 is moved at a first velocity (ultra-high velocity) Va without performing wobbling, and then the velocity is switched to a second velocity (high velocity) Vb and to a third velocity Vc, and the focus position FPs is made to seek the in-focus position FPj. Hence compared with auto-focus operations of the related art, in which wobbling is performed and the movement direction determined, after which the focus lens 1 is moved at the second velocity Vb to seek the in-focus position FPj, the focusing time can be greatly shortened.

Also, when the current focus position FPs is outside the subject existence range FJA but less distant than the determination distance LD1, the focus lens 1 is moved at the second velocity Vb without performing wobbling, so that compared with auto-focus operations of the related art in which wobbling is performed at the beginning of the auto-focus operation, the focusing time can be shortened. In particular, the lenses used in cameras for broadcasting and commercial use are large, so that the wobbling time is long (for example, approximately 0.25 seconds to 0.5 seconds). Hence the elimination of wobbling alone significantly shortens the focusing time.

Also, when the current focus position FPs is within the subject existence range FJA, the direction of movement of the focus lens cannot be determined from the distance measurement results Mag and focus position FPs. That is, because there is error in the distance measurement results Mag, when for example the focus position FPs is between the focus position indicated by the distance measurement results Mag and the in-focus position FPj, there may occur cases in which, if the focus position FPs is moved based on the distance measurement results Mag, the focus position FPs will be moved in the direction opposite the direction toward the in-focus position FPj. Hence when the focus position FPs is within the subject existence range FJA, wobbling is performed and the movement direction of the focus lens 1 is determined similarly to the related art, and thereafter hill-climbing control processing is performed. Hence when the focus position FPs is within the subject existence range FJA at the beginning, the focusing time is equal to that in the related art.

When the distance cannot be accurately measured by the distance measurement sensor 11, and the distance measurement result Mag is "distance measurement impossible data" NG, the lens driving operation cannot be performed based on the distance measurement result Mag, and so the same auto-focus operation as in the related art is performed. In this case also, the focusing time is equal to that of an auto-focus operation of the related art.

In this way, when the focus position FPs is distant from the subject existence range FJA, focus lens movement is initiated without performing wobbling, so that the focusing time can be shortened. Further, when the focus position FPs is more distant from the subject existence range FJA than the determination distance LD1, the focus lens is moved more rapidly, so that the focusing time can be further shortened. And, when the focus position FPs is detected as being within the subject existence range FJA, the focus position FPs is made to seek the in-focus position FPj similarly to the related art, so that although the focusing time is shortened, the focus seek accuracy can be maintained at the seek accuracy of the related art.

Here, the explanation of the flowchart shown in FIG. 19 is resumed. After the processing of step S1 is completed, the control unit 9 searches for an evaluation value peak (step S2).

Here the control unit 9 determines whether a relative maximum of the evaluation value has been detected (step S3). If a relative maximum has not been detected, evaluation value peak searching is continued until a relative maximum is detected (step S4).

In the determination processing of the above step S3, when a relative maximum is detected, the control unit 9 controls the lens driver 2 to return the focus lens to the focus position at which the relative maximum has been detected (step S5).

Here, the control unit 9 analyzes the evaluation value history, that is, the evaluation value at the relative maximum and the evaluation value at the current focus position, and uses the above-described conditions A, B, C to determine whether the subject is the in-focus (step S6). If the state is not the in-focus state, processing proceeds to step S9.

In the determination processing of the above step S6, upon determining that the state is the in-focus state, the control unit 9 stores the distance measurement result of the distance measurement sensor 11 at this time and the focus position at the relative maximum value in memory 10 (step S7).

Next, the control unit 9 updates (increments by one) the number of times the distance measurement result of the distance measurement sensor 11 and focus position at the relative maximum when the in-focus state have been recorded in memory 10 (step S8). The updated number of times is stored in memory 10.

Then, the control unit 9 determines whether the updated number has reached a prescribed number (for example, 100) (step S9). If the updated number has not reached the prescribed number, processing ends.

If, in the determination processing of the above step S9, the updated number has reached the prescribed number, the control unit 9 analyzes the relation between the plurality of stored distance measurement results of the distance measurement sensor 11 and focus positions at maxima, and derives a relational equation (or relation) (step S10). A method of derivation of this relational equation (or relation) has already been mentioned in the explanation of FIG. 14.

Then, the control unit 9 computes a correction amount for the distance measurement results according to this relational equation, and stores the correction amount in memory 10 or other rewritable storage unit (step S11). That is, the deviation between the distance measurement results LsA prior to changes with aging and the distance measurement results LsB after changes with aging, shown in FIG. 4, is computed, and based on the deviation amount, a correction amount for the distance measurement results is computed.

After storing the correction amount for distance measurement results, the control unit 9 then resets (initializes) the update number, and ends processing (step S12).

By computing and storing in storage unit the correction amount for distance measurement results in this way (a learning function), the control unit 9 can appropriately correct distance measurement results of the distance measurement sensor 11 even when changes with aging occur within the distance measurement sensor 11, so that accuracy can be retained, and problematic auto-focus operations due to deviations in distance measurement results can be prevented. Hence in focus searching of an auto-focus operation using distance measurement information of the distance measurement sensor and evaluation values, the focusing time when the focus lens is distant from the in-focus position can be significantly shortened compared with image processing auto-focus operations, while retaining the focus searching accuracy obtained in image processing.

Also, a plurality of evaluation values (and luminance addition values) acquired can be used to determine whether focus searching in image processing has been performed accurately (in-focus determination), and by this unit erroneous correction of distance measurement results can be prevented. As a result, the reliability of distance measurement result correction is improved.

In the flowchart shown in FIG. 19, whether the conditions for learning (whether the update number has reached a prescribed number) have been met is checked at the time of initiation of the auto-focus operation, and if the conditions have been met, learning is performed; but there is no need to synchronize the processing of step S9 and subsequent steps with the startup of the auto-focus operation. That is, learning may be performed with timing different from startup of an auto-focus operation.

Figure 23:
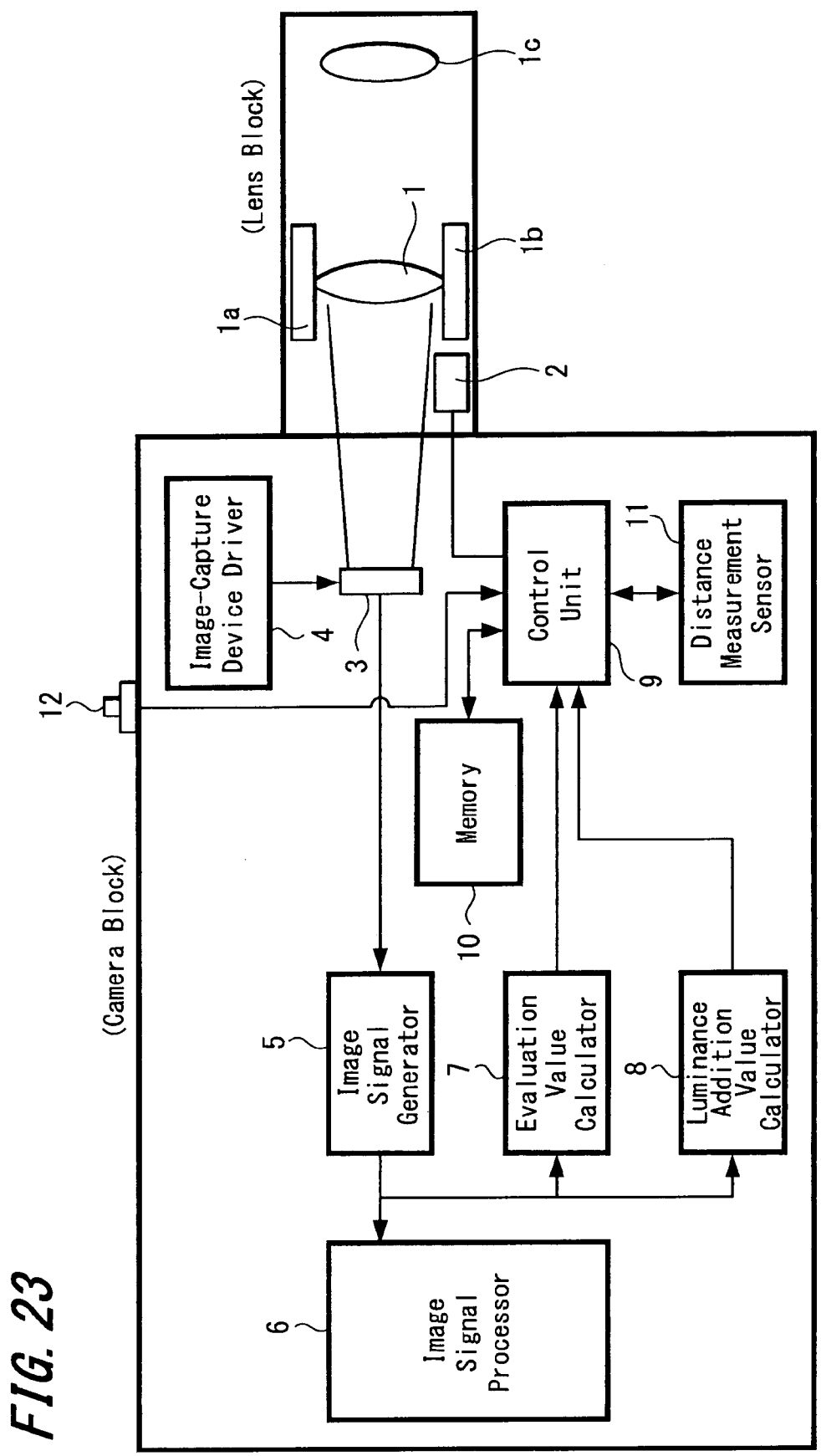
FIG. 23 shows the configuration of the video camera in a second embodiment of the present invention according to an embodiment of the present invention.

Next, a second embodiment of the invention is explained. The overall configuration of the video camera of the second embodiment of the invention is shown in FIG. 22. The video camera shown in FIG. 23 is configured such that a dedicated learning function switch 12 relating to the distance measurement result correction amount is added to the video camera configuration shown in FIG. 6. In FIG. 23, portions corresponding to portions in FIG. 6 are assigned the same symbols, and detailed explanations are omitted.

In this embodiment, only when a switch 12 installed in the video camera is depressed by the user, causing a permission signal to be applied to the control unit 9 from the switch 12, is the "storage in storage unit (memory 10) of the distance measurement result of the distance measurement sensor and focus position at the time of auto-focus convergence" described in the above first embodiment (see FIG. 6 through FIG. 22) performed. In the first embodiment, the above storage processing was performed automatically in step S7 of FIG. 19, but in the second embodiment, the above storage processing is performed after obtaining permission from the user.

Then, as in the above first embodiment, in response to the permission signal from the switch 12, the number of storage operations is updated each time the distance measurement result and focus position are stored, and when the number of updates reaches a prescribed number (for example, 100), the correction amount for distance measurement results is computed.

By means of this invention, the above-described storage processing is performed after obtaining permission from the user, so that computation of correction amounts not intended by the user, as a result of an erroneous in-focus determination, can be prevented. Otherwise, advantageous results similar to those of the above first embodiment are obtained.

In the first embodiment and second embodiment, the above number of storage times is a prescribed number; but a configuration is possible in which this prescribed number can be set by the user. This setting is performed using a switch (operation switch) different from the switch 12 which imparts permission instructions, shown in FIG. 23, or an assignable switch in software to which functions can freely be allocated, or the like.

Figure 24:
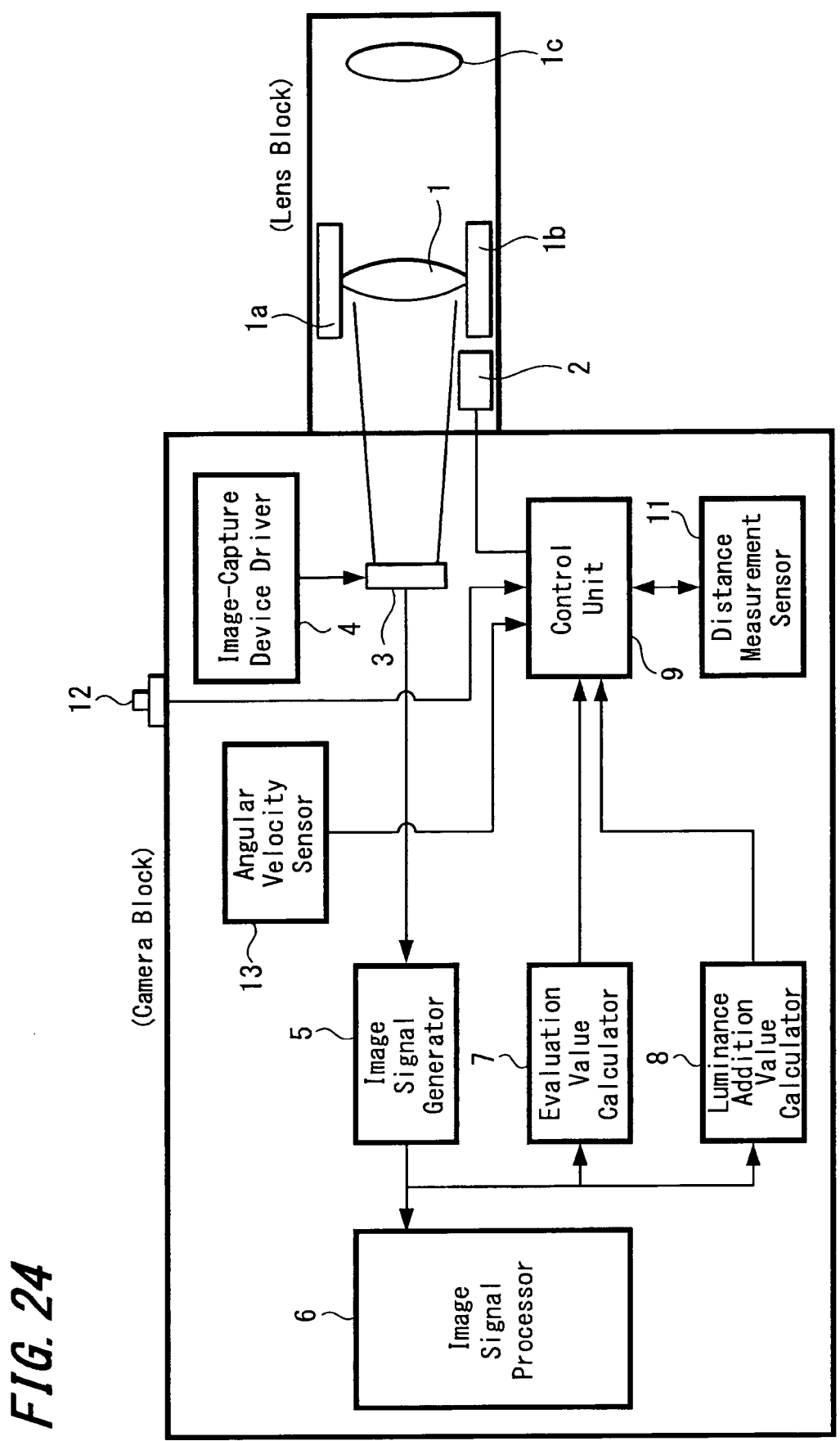
FIG. 24 shows the configuration of the video camera in a third embodiment of the present invention according to an embodiment of the present invention.

Next, a third embodiment of the invention is explained. The overall configuration of the video camera of the third embodiment of the invention is shown in FIG. 24. The video camera shown in FIG. 24 is configured with an angular velocity censor 13 (in this example, using two axes) is added to the video camera configuration shown in FIG. 23. In FIG. 24, portions corresponding to FIG. 6 are assigned the same symbols, and detailed explanations are omitted.

The angular velocity censor 13 incorporates functions to generate an angular velocity signal from a detected angular velocity value, and to output the signal to the control unit 9. The angular velocity signal is a signal corresponding to the angular velocity applied to the video camera itself.

In this example, first the control unit 9 detects an evaluation value relative maximum in evaluation value peak search operation, similarly to the above-described first embodiment, and when the focus lens is returned to the point at which the above evaluation value relative maximum is detected, the history of the evaluation value, or of both the evaluation value and a luminance addition value, are checked, and a determination is made as to whether the subject is the in-focus or out-of-focus has been normally attained (see step S6 in FIG. 19).

Further, in this example, whether or not the angular velocity signal detected by the angular velocity sensor 13 has been scrutinized when detecting the evaluation value relative maximum by the control unit 9 is within a prescribed range of magnitudes. If the angular velocity signal is outside the prescribed range of magnitudes, it is determined that the video camera is being moved, and regardless of any focal determination using the above evaluation values or the like, it is determined that the subject being in-focus is unreliable, and recording of the focus position and distance measurement results of the distance measurement sensor 11, explained in the first embodiment (see step S7 in FIG. 19), is not performed. Below, focal determination equations relating to the above angular velocity signal are indicated.

$$V_{pan} < V_{min} \text{ or } V_{max} < V_{pan}$$

or $$V_{tilt} < V_{min} \text{ or } V_{max} < V_{tilt} \qquad (4)$$

where $V_{pan}$ and $V_{tilt}$ are angular velocity signals in the pan and tilt directions respectively, and $V_{max}$ and $V_{min}$ ($V_{max} > V_{min}$) are constants.

When equation (4) is not satisfied, the control unit 9 determines that the video camera has been moved, Also, focal determination is determined to be unreliable, and recording of the distance measurement results and focus position is not performed. In this manner, focal determinations are determined by eliminating an adverse effect of video camera wobbling, so that accurate determination results are obtained. Hence more accurate distance measurement result correction amounts can be computed.

It should be noted that this invention is not limited to the above-described embodiments; for example, an image-capture device of this invention can be applied to a digital camera instead of the above-described video camera, and various other changes and modifications can of course be made without deviating from the gist of the invention.

For example, in the above third embodiment, an angular velocity sensor was used as unit of detecting movement of the video camera; but a two-axis or three-axis acceleration sensor may be used to detect movement.

It should be understood by those skilled in the art that various modifications, combinations, sub-combinations, and alterations may occur depending on design requirements and other factors, insofar as they are within the scope of the appended claims or the equivalents thereof.

What is claimed is:

1. An auto-focus apparatus comprising:
   an evaluation value calculator configured to periodically calculate evaluation values using high frequency components of image signals in a specific region of a subject image captured by an image-capture unit;
   a distance measurement unit configured to measure a distance to a subject and output a distance measurement result;
   a control unit configured to output instruction values provided to a lens driver for driving a focus lens based on the evaluation values and determining whether a subject image is in-focus or out-of-focus, using the evaluation values; and
   a storage configured to store distance measurement results and positions of the focus lens,
   wherein after the control unit operates to search the peak of the evaluation values while moving positions of the focus lens and detects the relative maximum of the evaluation values, the control unit returns the focus lens to the position corresponding to a point at which the relative maximum has been detected, obtains the evaluation values calculated by the evaluation value calculator, stores the focus position and distance measurement results when the evaluation values satisfy a prescribed condition, and retrieves the distance measurement results and focus positions when the number of times that the focus positions and distance measurement results are stored reaches a prescribed number, and computes a correction amount for distance measurement results output from the distance measurement unit based on a relation between the retrieved distance measurement results and focus positions.

2. An auto-focus apparatus according to claim 1, wherein the prescribed condition involves that when a first evaluation value is defined as the relative maximum of the evaluation values and a second evaluation value is defined as the evaluation value obtained when the focus lens returns to the position corresponding to a point at which the relative maximum has been detected, a value obtained from dividing the second evaluation value by the first evaluation value is larger than a prescribed threshold.

3. An auto-focus apparatus according to claim 1, wherein the prescribed condition involves that when a first evaluation value is defined as the relative maximum of the evaluation values and a second evaluation value is defined as the evaluation value obtained when the focus lens returns to the position corresponding to a point at which the relative maximum has been detected, a value obtained from dividing the second evaluation value by the first evaluation value is larger than the first threshold and the second evaluation value is larger than the second threshold.

4. An auto-focus apparatus according to claim 1, wherein a luminance addition value calculator configured to calculate luminance addition values by integrating luminance of the image signals in the specific region,
   wherein when a first luminance addition value is defined as the luminance addition value obtained when the relative maximum has been detected, and a second luminance addition value is defined as the luminance addition value obtained a prescribed fields before the current field at which the relative maximum has been detected, the control unit stores the distance measurement result and the focus position obtained at a point where the control unit determines that a value obtained from dividing the second luminance addition value by the first luminance value falls within a prescribed threshold and the evaluation values satisfy the prescribed condition.

5. An auto-focus apparatus according to claim 1, further comprising
   a wobbling detector configured to detect wobbling applied to the auto-focus apparatus,
   wherein the control unit stores the distance measurement result and the focus position obtained at a point where the control unit determines that the magnitude detected by the wobbling detector at a point where the relative maximum of the evaluation values has been detected falls within a prescribed range of values, and the evaluation values satisfy the prescribed condition.

6. An auto-focus apparatus according to claim 5, wherein the wobbling detector indicates an angular velocity sensor or an acceleration sensor.

7. An auto-focus apparatus comprising:
   an evaluation value calculator configured to periodically calculate evaluation values using high frequency components of image signals in a specific region of a subject image captured by an image-capture unit;
   a distance measurement unit configured to measure a distance to a subject and output a distance measurement result;
   a control unit configured to output instruction values provided to a lens driver for driving a focus lens based on the evaluation values and determining whether a subject image is in-focus or out-of-focus, using the evaluation value; and
   a storage configured to store distance measurement results and positions of the focus lens, wherein
   if after the control unit operates to search the peak of the evaluation values while moving positions of the focus lens and detects the relative maximum of the evaluation values, the control unit returns the focus lens to the position corresponding to a point at which the relative maximum has been detected, obtains the evaluation values calculated by the evaluation value calculator, stores the focus position and distance measurement results when the evaluation values satisfy a prescribed condition, and detects enabling signals transmitted from the control unit, the control unit retrieves the distance measurement results and focus positions when the number of times that the focus positions and distance measurement results are stored reaches a prescribed number, and computes a correction amount for distance measurement results output from the distance measurement unit based on a relation between the retrieved distance measurement results and focus positions.

8. An auto-focus apparatus according to claim 7, wherein the control unit stores distance measurement results and positions of the focus lens at the position at which the enabling signals have been detected, retrieves the distance measurement results and focus positions, and computes a correction amount for distance measurement results output from the distance measurement unit based on a relation between the retrieved distance measurement results and focus positions.

9. An image-capture apparatus comprising:
an auto-focus apparatus including an image-capture unit configured to image a subject, an evaluation value calculator configured to periodically calculate evaluation values using high frequency components of image signals in a specific region of a subject image captured by the image capture unit;
a distance measurement unit configured to measure a distance to the subject and output a distance measurement result;
a control unit configured to output instruction values provided to a lens driver for driving a focus lens based on the evaluation values and determines whether a subject image is in-focus or out-of-focus, using the evaluation values, and a storage configured to store distance measurement results and positions of the focus lens,
wherein after the control unit operates to search the peak of the evaluation values while moving positions of the focus lens and detects the relative maximum of the evaluation values, the control unit returns the focus lens to the position corresponding to a point at which the relative maximum has been detected, obtains the evaluation values calculated by the evaluation value calculator, stores the focus position and distance measurement results when the evaluation values satisfy a prescribed condition, and retrieves the distance measurement results and focus positions when the number of times that the focus positions and distance measurement results are stored reaches a prescribed number, and computes a correction amount for distance measurement results output from the distance measurement unit based on a relation between the retrieved distance measurement results and focus positions.

10. An image-capture apparatus comprising:
an auto-focus apparatus including
an operation unit,
an image-capture unit configured to image a subject,
an evaluation value calculator configured to periodically calculate evaluation values using high frequency components of image signals in a specific region of a subject image captured by the image capture unit,
a distance measurement unit configured to measure a distance to the subject and output a distance measurement result,
a control unit configured to output instruction values provided to a lens driver for driving a focus lens based on the evaluation values and determining whether a subject image is in-focus or out-of-focus, using the evaluation values, and
a storage configured to store distance measurement results and positions of the focus lens,
wherein if after the control unit operates to search the peak of the evaluation values while moving positions of the focus lens and detects the relative maximum of the evaluation values, the control unit returns the focus lens to the position corresponding to a point at which the relative maximum has been detected,
obtains the evaluation values calculated by the evaluation value calculator,
stores the focus position and distance measurement result when the evaluation values satisfy a prescribed condition, and
detects enabling signals transmitted from the control unit,
the control unit retrieves the distance measurement results and focus positions when the number of times that the focus position and distance measurement result are stored reaches a prescribed number, and computes a correction amount for distance measurement results output from the distance measurement unit based on a relation between the retrieved distance measurement results and focus positions.

11. An auto-focus method performed by an auto-focus apparatus configured to automatically adjust focus of a subject using distance information to the subject and evaluation values obtained in image processing, comprising the steps of:
periodically calculating evaluation values using high frequency components of image signals in a specific region of a subject image captured by an image capture unit,
measuring a distance to a subject and outputting a distance measurement result,
operating to search the peak of the evaluation values based on the evaluation values and distance measurement result while moving positions of a focus lens,
calculating the evaluation values by returning the focus lens to the position corresponding to a point at which the relative maximum has been detected after having detected the relative maximum of the evaluation values,
storing the distance measurement results and focus positions in the storage when the evaluation values satisfy a prescribed condition, and
retrieving the distance measurement results and focus positions when the number of times that the focus positions and distance measurement results are stored reaches a prescribed number, and computing a correction amount for distance measurement results output from the distance measurement unit based on a relation between the retrieved distance measurement results and focus positions.

12. An auto-focus method performed by an auto-focus apparatus configured to automatically adjust focus on a subject using distance information to the subject and evaluation values obtained in image processing, comprising the steps of:
periodically calculating evaluation values using high frequency components of image signals in a specific region of a subject image captured by an image capture unit,
measuring a distance to a subject and outputting a distance measurement result,
operating to search the peak of the evaluation values based on the evaluation values and distance measurement result while moving positions of a focus lens,
calculating the evaluation values by returning the focus lens to the position corresponding to a point at which the relative maximum has been detected after having detected the relative maximum of the evaluation values,
storing the distance measurement results and focus positions in the storage when the evaluation values satisfy a prescribed condition if enabling signals transmitted from the control unit are detected, retrieving the distance measurement results and focus positions when the number of times that the focus positions and distance measurement results are stored reaches a prescribed number, and computing a correction amount for distance measurement results output from the distance measurement unit based on a relation between the retrieved distance measurement results and focus positions.

13. An auto-focus apparatus comprising:

an evaluation value calculator configured to periodically calculate evaluation values using high frequency components of image signals in a specific region of a subject image captured by an image capture unit;

a distance measurement unit configured to measure a distance to a subject and output a distance measurement result;

a control unit configured to output instruction values provided to a lens driver for driving a focus lens based on the evaluation values and determining whether a subject image is in-focus or out-of-focus, using the evaluation values, and a storage configured to store distance measurement results and positions of the focus lens, wherein after the control unit operates to search the peak of the evaluation values while moving positions of the focus lens and detects the relative maximum of the evaluation values, the control unit returns the focus lens to the position corresponding to a point at which the relative maximum has been detected, obtains the evaluation values calculated by the evaluation value calculator, stores the focus positions, distance measurement results and determination results as to whether or not the evaluation values satisfy a prescribed condition, and retrieves the distance measurement results, focus positions and determination results when the number of times the distance measurement results, focus positions and determination results are stored reaches a prescribed number, and computes a correction amount for distance measurement results output from the distance measurement unit based on a relation between the retrieved distance measurement results, focus positions and determination results.

* * * * *